US009351016B2

(12) United States Patent
Deshpande et al.

(10) Patent No.: US 9,351,016 B2
(45) Date of Patent: May 24, 2016

(54) DEVICES FOR IDENTIFYING A LEADING PICTURE

(75) Inventors: Sachin G. Deshpande, Camas, WA (US); Louis Joseph Kerofsky, Camas, WA (US)

(73) Assignee: SHARP KABUSHIKI KAISHA, Tokyo (JP)

( * ) Notice: Subject to any disclaimer, the term of this patent is extended or adjusted under 35 U.S.C. 154(b) by 792 days.

(21) Appl. No.: 13/447,126

(22) Filed: Apr. 13, 2012

(65) Prior Publication Data

US 2013/0272618 A1     Oct. 17, 2013

(51) Int. Cl.
*H04N 19/70* (2014.01)
*H04N 19/68* (2014.01)
*H04N 19/46* (2014.01)
*H04N 19/573* (2014.01)

(52) U.S. Cl.
CPC ............... *H04N 19/68* (2014.11); *H04N 19/46* (2014.11); *H04N 19/573* (2014.11); *H04N 19/70* (2014.11)

(58) Field of Classification Search
None
See application file for complete search history.

(56) References Cited

U.S. PATENT DOCUMENTS

| 2013/0107953 A1* | 5/2013 | Chen et al. | 375/240.12 |
| 2013/0273945 A1* | 10/2013 | Deshpande | 455/466 |
| 2013/0279564 A1 | 10/2013 | Wang | |
| 2013/0279575 A1 | 10/2013 | Wang | |
| 2013/0279599 A1 | 10/2013 | Wang | |

FOREIGN PATENT DOCUMENTS

WO     2004/008735     1/2004

OTHER PUBLICATIONS

Bross, B.—"High efficiency video coding (HEVC) text specification draft 6"—JCTVC-H1003, 7th Meeting Geneva, Nov. 20-30, 2011.*
Chen, Y.—"Conforming bitstreams starting with CRA pictures"—JCTVC-G319, 7th Meeting Geneva, Nov. 21-30, 2011.*
Wang, Y.—"Report of the BoG on clean random access (CRA) picture"—JCTVC-F759, 6th Meeting Torino, Jul. 14-22, 2011.*
Ye-Kui Wang et al., "On Bitstreams Starting with CRA Pictures," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, document: JCTVC-H0496r2, Feb. 10, 2012.
Sachin Deshpande and Andrew Segall, "On Leading Pictures," Joint Collaborative Team on Video Coding (JCT-VC) of ITU-T SG16 WP3 and ISO/IEC JTC1/SC29/WG1, 9th Meeting: Geneva, CH, Apr. 27-May 7, 2012, Document: JCTVC-I0275, Apr. 27, 2012.

(Continued)

*Primary Examiner* — Bernard Krasnic
(74) *Attorney, Agent, or Firm* — Birch, Stewart, Kolasch & Birch, LLP

(57) ABSTRACT

An electronic device for indicating a leading picture is described. The electronic device includes memory in communication with a processor and instructions stored in the memory. The electronic device encodes a first picture. The electronic device further determines whether a leading picture is present. The electronic device further generates an explicit leading picture indicator if a leading picture is present. The electronic device further sends the explicit leading picture indicator if a leading picture is present.

8 Claims, 12 Drawing Sheets

(56) References Cited

OTHER PUBLICATIONS

Sachin Deshpande and Louis Kerofsky, "Signaling of CRA Pictures," Joint Collaborative Team on Video Coding (JCT-VC) of ITU-T SG16 WP3 and ISO/IEC JTC1/SC29/WG11, 9$^{th}$ Meeting: Geneva, CH, Apr. 27-May 7, 2012, Document: JCTVC-I0278, Apr. 27, 2012.

International Search Report issued for International Application No. PCT/JP2013/002532 on May 21, 2013.

Y.-K. Wang, Y. Chen, M. Karczewicz, J. Chen, "On Bitstreams Starting with CRA Pictures," JCTVC-H049693 8th Meeting: San Jose, USA, Feb. 1-10, 2012.

Benjamin Bross, et al., "High-Efficiency Video Coding (HEVC) Text Specification Draft 6," JCTVC-H1003_dK, San Jose, US, Feb. 1-10, 2012.

Restriction Requirement issued on Apr. 22, 2015 against copending U.S. Appl. No. 13/470,089.

Hendry et al: "Undiscardable Leading Pictures for CRA", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); No. JCTVC-G158, Nov. 8, 2011, XP030110142.

Wang: "Gradual Decoder Refresh Using Isolated Regions", 3. JVT Meeting; 60. MPEG Meeting; Jun. 5, 2002-Oct. 5, 2002; Fairfax, US; (Joint Video Team of ISO/IEC JTC1/ SC29/ WG11 and ITU-T SG. 16),, No. JVT-C074, May 10, 2002, XP030005183.

Sullivan, Gary J. 'CRA pictures with broken links.' JCTVC-10404. 9th meeting. Geneva, CH, Apr. 27-May 7, 2012 (pp. 1-3).

US Office Action, dated Jan. 22, 2016, in related U.S. Appl. No. 13/470,089.

European Search Report issued on Apr. 8, 2016 in corresponding European Patent Application No. 13775593.0.

Wang: "On Random Access", 4.JVT Meeting; 61. MPEG Meeting; Jul. 22, 2002-Jul. 26, 2002; Klagenfurt, AT; (Joint Video Team of ISO/IEC JTC1/SC29/WG11 and ITU-T SG.16) no, JVT-D097, Jul. 26, 2012, XP030005371, ISSN: 0000-0441, (pp. 1-13).

* cited by examiner

DEVICES FOR IDENTIFYING A LEADING PICTURE

TECHNICAL FIELD

The present disclosure relates generally to electronic devices. More specifically, the present disclosure relates to devices for identifying a leading picture.

BACKGROUND

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and playback presents several challenges. As can be observed from this discussion, systems and methods that represent digital media more efficiently may be beneficial.

DETAILED DESCRIPTION

Figure 1:
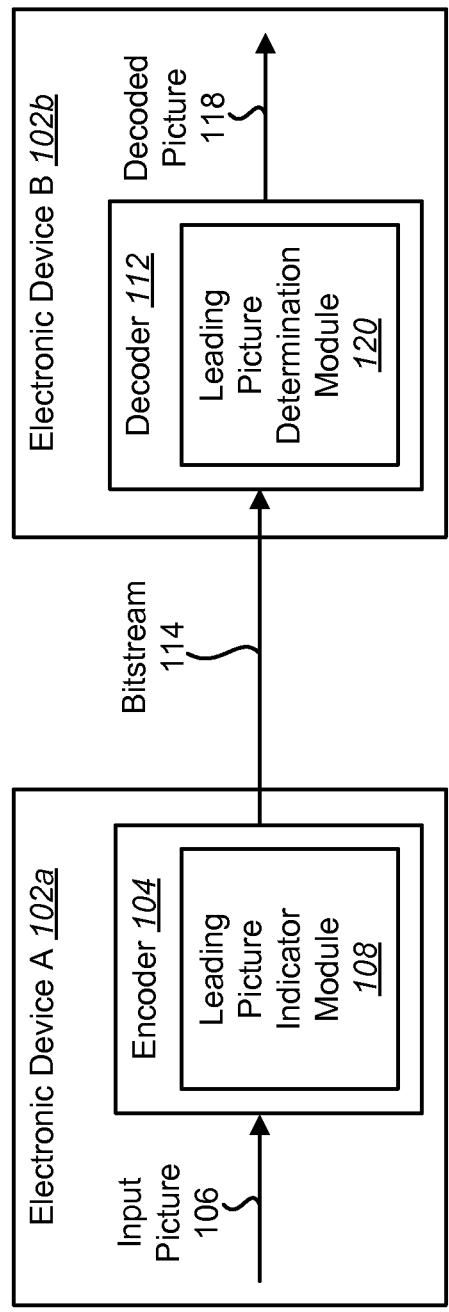
FIG. 1 is a block diagram illustrating an example of one or more devices in which systems and methods for identifying a leading picture may be implemented.

An electronic device for indicating a leading picture is described. The electronic device includes a processor and memory in electronic communication with the processor. The electronic device includes instructions stored in memory. The electronic device encodes a first picture. The electronic device also determines whether a leading picture is present. The electronic device generates an explicit leading picture indicator if a leading picture is present. The electronic device also sends the explicit leading picture indicator if a leading picture is present.

The first picture may be a clean random access (CRA) picture. The explicit leading picture indicator may be associated with the CRA picture and indicate that at least one leading picture follows the CRA picture. The explicit leading picture indicator may also be associated with the leading picture. The explicit leading picture indicator may also include at least one of a group consisting of a flag in a Sequence Parameter Set (SPS), Picture Parameter Set (PPS), Adaptation Parameter Set (APS) and a slice header for a CRA picture.

If a leading picture is not present, the electronic device may generate an explicit leading picture absence indicator. The electronic device may also send the explicit leading picture absence indicator. Determining whether a leading picture is present may include determining whether a second picture follows the first picture in decoding order and precedes the first picture in an output order.

The explicit leading picture indicator may be a Network Access Layer (NAL) unit type. The NAL unit type may include a NAL unit type associated with a leading picture. The NAL unit type may include a NAL unit type associated with a CRA picture with a subsequent leading picture. The NAL unit type may also include a NAL unit type associated with a CRA picture without a subsequent leading picture. The NAL unit type may also include at least one of a group consisting of a slice header for the CRA picture and a slice header for a leading picture.

An electronic device for determining whether a leading picture is present is also described. The electronic device includes a processor and memory in electronic communication with the processor. The electronic device also includes instructions stored in the memory. The electronic device receives a bitstream. The electronic device also determines whether a leading picture is present based on whether the bitstream includes an explicit leading picture indicator. The electronic device also performs an operation on the bitstream based on whether a leading picture is present. Performing an operation on the bitstream may include discarding the leading picture if a leading picture is present.

The electronic device may also be a processing device (e.g., network node). The leading picture may also correspond to a CRA picture at a random access point if a leading picture is present.

Determining whether a leading picture is present includes determining that a leading picture is present if the bitstream includes an explicit leading picture indicator. Determining whether a leading picture is present may also include determining that a leading picture is absent if the bitstream includes an explicit leading picture absence indicator or if the bitstream does not include an explicit leading picture indicator.

The explicit leading picture indicator may include at least one of a group consisting of a NAL unit type, a flag in a SPS, PPS, APS and a slice header for a CRA picture. The explicit leading picture indicator may also be a NAL unit type. The NAL unit type may include a NAL unit type associated with a CRA picture without a subsequent leading picture.

A method for determining whether a leading picture is present by an electronic device is also described. The method includes encoding a first picture. The method also includes determining whether a leading picture is present. The method also includes generating an explicit leading picture indicator if a leading picture is present. The method also includes sending the explicit leading picture indicator if a leading picture is present.

A method for determining whether a leading picture is present by an electronic device is also described. The method includes encoding a bitstream. The method also includes determining whether a leading picture is present based on whether the bitstream includes an explicit leading picture indicator. The method also includes performing an operation on the bitstream based on whether a leading picture is present.

The systems and methods disclosed herein describe approaches for identifying a leading picture. For example, some configurations described herein include devices and methods for signaling CRA pictures. Further, some of the described devices and approaches may be used to distinguish between CRA pictures with subsequent leading pictures as well as CRA pictures without subsequent leading pictures.

There is often a need to identify leading pictures within a bitstream. Known systems currently identify leading pictures in a bitstream by performing extensive encoding and decoding operations of various parameter sets. For example, known systems identify leading pictures by encoding and decoding SPS and PPS. Known systems may also compute a picture order count (POC) value and compare computed values to POC values of corresponding CRA pictures. Known methods further compare CRA pictures to corresponding calculated values to determine whether or not a picture is a leading picture. Performing these steps may have a detrimental effect on a system and require extensive processing of data for identifying leading pictures and performing operations on bitstreams.

In an effort to remedy some of these difficulties, the systems and methods herein provide approaches for identifying leading pictures. In some approaches, one or more indicators may be implemented to indicate whether a CRA picture has a subsequent leading picture in a bitstream. For example, in one configuration, a new NAL unit may be introduced to indicate whether a CRA picture has one or more leading pictures following the CRA picture in a bitstream. In another configuration, a flag in the SPS, PPS and/or APS may be utilized for indicating whether a leading picture is present following a CRA picture. Benefits of this approach may include permitting an electronic device to identify a leading picture without extensive encoding or decoding by one or more electronic devices.

In providing an indicator associated with a CRA picture, it should be noted that a CRA picture may include a coded picture containing coded slices associated with a certain type of NAL unit. In some cases, a CRA picture may include only intra-prediction slices (I-slices) that are decoded using intra predictions only. For example, in one configuration, a CRA picture is a coded picture including coded slices with a NAL unit type (nal_unit_type) equal to 4. In some cases, all coded pictures that follow a CRA picture in decoding order and output order may be unable to use inter prediction from any picture that precedes the CRA picture either in decoding order or output order. Also, in some cases, other pictures that precede the CRA picture in decoding order may also precede the CRA picture in output order.

In some configurations, a NAL unit type may specify the type of raw byte sequence payload (RBSP) data structure contained in a NAL unit. In one example, NAL units that use a NAL unit type equal to 0 or in the range of 24-63 may not affect the decoding process specified in various configurations. It should be noted that in one example, NAL unit types 0 and 24-63 may be used as determined by various applications. In some configurations described herein, a decoder may ignore contents of NAL units that use reserved or unspecified values of NAL unit types.

Examples of NAL unit type codes and NAL unit type classes that may be implemented in accordance with the systems and methods disclosed herein are included in Table 1 and Table 11 below. It may be noted that some configurations may include similar and different fields to those described below. In some configurations, some or all of the NAL fields in Table 1 may be examples of different NAL unit types. In some configurations, certain NAL unit types may be associated with different fields and syntax structures associated with one or more pictures. Further explanations of one or more fields are included below. It should be noted that Table 1 below includes abbreviations for Video Coding Layer (VCL) NAL unit type classes, Instantaneous Decoding Refresh (IDR) pictures and Temporal Layer Access (TLA) pictures. Further examples included in relation to Table 1 may also be applicable to Table 11 and other configurations described below.

TABLE 1

| nal_unit_type | Content of NAL unit and RBSP syntax structure | NAL unit type class |
| --- | --- | --- |
| 0 | Unspecified | non-VCL |
| 1 | Coded slice of a non-IDR, non-CRA and non-TLA picture slice_layer_rbsp( ) | VCL |
| 2 | Reserved | n/a |
| 3 | Coded slice of a TLA picture slice_layer_rbsp( ) | VCL |
| 4 | Coded slice of a CRA picture with subsequent leading pictures slice_layer_rbsp( ) | VCL |
| 5 | Coded slice of an IDR picture slice_layer_rbsp( ) | VCL |
| 6 | Supplemental enhancement information (SEI) sei_rbsp( ) | non-VCL |
| 7 | Sequence parameter set seq_parameter_set_rbsp( ) | non-VCL |
| 8 | Picture parameter set pic_parameter_set_rbsp( ) | non-VCL |
| 9 | Access unit delimiter access_unit_delimiter_rbsp( ) | non-VCL |
| 10-11 | Reserved | n/a |
| 12 | Filler data filler_data_rbsp( ) | non-VCL |
| 13 | Reserved | n/a |
| 14 | Adaptation parameter set aps_rbsp( ) | non-VCL |
| 16 | Coded slice of a CRA picture with no subsequent leading pictures slice_layer_rbsp( ) | VCL |
| 17-23 | Reserved | n/a |
| 24-63 | Unspecified | Non-VCL |

In this example, the syntax may include a supplemental enhancement (SEI) information RBSP syntax. An SEI RBSP may contain one or more SEI messages. Each SEI message may include variables specifying the type payloadType and size payloadSize of the SEI payload. The derived SEI payload size payloadSize may be specified in bytes and may be equal to the number of RBSP bytes in the SEI payload.

In one example, the syntax may also include access unit delimiter RBSP syntax. An access unit delimiter may be used to indicate the type of slices present in a coded picture and to simplify the detection of the boundary between access units. There may be no normative decoding process associated with the access unit delimiter.

In one example, the syntax may also include filler data RBSP syntax. The filler data RBSP may contain bytes whose value is equal to 0xFF. Further, no normative decoding process may be specified for filler data RBSP. The ff_byte is a byte equal to 0xFF.

The slice layer RBSP may include a slice header and slice data followed by rbsp_slice_trailing_bits. An example is shown in Table 2 below:

TABLE 2

```
slice_later_rbsp( ) {
    slice_header( )
    slice_data( )
    rbsp_slice_trailing_bits( )
}
```

An example of a RBSP slice trailing bits syntax is shown in Table 3 below:

TABLE 3

```
rbsp_slice_trailing_bits( ) {
    rbsp_trailing_bits( )
    while( more_rbsp_trailing_data( ) )
        cabac_zero_word /* equal to 0x0000 */
}
```

In these examples, capac_zero_word may be a byte_aligned sequence of two bytes equal to 0x0000. Further, NumBytesInVclNALunits may be the sum of the values of NumBytesinNALunit for all VCL units of a coded picture. Further, BinCountsInNALunits may be the number of times that the parsing process function DecodeBin( ) may be invoked to decode the contents of all VCL NAL units of a coded picture.

The variables RawMinCUBits and PicSizeMinCUs may be derived as follows:

RawMinCUBits = (1 << Log2MinCUSize) * (1 << Log2MinCUSize) * BitDepthY + 2 * (1 << Log2MinCUSize − 1) ) *
(1 << Log2MinCUSize − 1) ) * BitDepthC, and PicSizeMinCUs = Ceil( pic_width_in_luma_samples ÷ (1 << Log2MinCUSize ) ) *
Ceil( pic_height_in_luma_samples ÷
(1 << Log2MinCUSize ) ).

In this approach, BinCountsInNALunits may not exceed:

(32÷3)*NumBytesInVclNALunits+
(RawMinCUBits*PicSizeInMinCUS)÷32.

It should be noted that the constraint on the maximum number of bins resulting from the decoding of the contents of the slice layer NAL unit may be met by inserting a number of cabac_zero_word syntax elements to increase the value of NumBytesInVclNALunits. Each cabac_zero_word may be represented in a NAL unit by the three-byte sequence 0x000003 (as a result of the constraints on NAL unit contents that result in requiring inclusion of an emulation_prevention_three_byte for each cabac_zero_word).

One example of a RBSP trailing bits syntax is shown in Table 4 below:

TABLE 4

```
rbsp_trailing_bits( ) {
    rbsp_stop_one_bit /* equal to 1 */
    while( !byte_aligned( ) )
        rbsp_alignment_zero_bit /* equal to 0 */
}
```

Table 4 provides an example of RBSP trailing bits semantics. In this example, the rbsp_stop_bit may be equal to 1 and the rbsp_alignment_zero_bit may be equal to 0.

An example of byte alignment syntax is shown in Table 5 below.

TABLE 5

```
byte_alignment( ) {
    while( !byte_aligned( ) )
        bit_equal_to_one
}
```

Table 5 provides an example of byte alignment semantics. In this example, the bit_equal_to_one may be equal to 1.

In these examples, the sequence parameter set RBSP may include syntax elements corresponding to SPS raw byte sequence payload. The sequence parameter set RBSP may include syntax elements corresponding to PPS raw byte sequence payload. The sequence parameter set RBSP may include syntax elements corresponding to APS raw byte sequence payload.

In some approaches, a signal or indicator may be associated with a leading picture to indicate a leading picture that follows a CRA picture in a bitstream. For example, a leading picture may be indicated as a leading picture by a NAL unit type associated with the leading picture. A benefit of providing an explicit leading picture indicator in this approach may include avoiding decoding or modifying the PPS, SPS or other fields. Further, this approach may enable identifying one or more leading pictures without performing certain decoding operations.

In some approaches, one or more indicators may be implemented to indicate the absence of a leading picture. In one example, a NAL unit, flag or other indicator may be introduced associated with a CRA picture that indicates an absence of one or more leading pictures in a bitstream. One benefit of this approach is that an explicit leading picture indicator may be created without extensive coding of one or more pictures.

The systems and methods disclosed herein may provide one or more additional benefits in processing a bitstream of data. In one configuration, a bitstream may be transmitted between one or more electronic devices with explicit indicators corresponding to one or more leading pictures. This may be employed to reduce the amount of processing by an electronic device where it would be beneficial to know whether a bitstream includes a leading picture. Under another configuration, an electronic device may discard one or more leading pictures without extensive processing of a bitstream. One benefit of discarding a leading picture without extensive processing may include reducing the amount of data output or transmitted without an overly detrimental effect to the quality of a signal or display including one or more pictures. In some configurations, these and other benefits may contribute to more effective streaming of data between electronic devices.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating an example of one or more electronic devices 102a-b in which systems and methods for identifying a leading picture may be implemented. In this example, electronic device A 102a and electronic device B 102b are illustrated. However, it should be noted that one or more of the features and functionality described in relation to electronic device A 102a and electronic device B 102b may be combined into a single electronic device in some configurations.

Electronic device A 102a includes an encoder 104 and a leading picture indicator module 108. Each of the elements included within electronic device A 102a (e.g., the encoder 104 and leading picture indicator module 108) may be implemented in hardware, software or a combination of both.

Electronic device A 102a may obtain an input picture 106. In some configurations, the input picture 106 may be captured on electronic device A 104a using an image sensor, retrieved from memory and/or received from another electronic device.

The encoder 104 may encode the input picture 106 to produce encoded data. For example, the encoder 104 may encode a series of input pictures 106 (e.g., video). In one configuration, the encoder 104 may be a High Efficiency Video Coding (HEVC) encoder. The encoded data may be included in a bitstream 114. The encoder 104 may generate overhead signaling based on the input picture 106.

The leading picture indicator module 108 may provide an indicator corresponding to a leading picture. For example, the leading picture indicator module 108 may determine whether a leading picture is present. The leading picture indicator module 108 may further generate an explicit leading picture indicator if a leading picture is present. In some configurations, the leading picture indicator module 108 may send or otherwise share the explicit leading picture indicator with one or more electronic devices. In one example, electronic device A 102a may send one or more leading picture indicators to electronic device B 102b. One benefit of generating an explicit leading picture indicator may include reducing operations performed on one or more pictures when processing one or more pictures in a bitstream.

One or more kinds of indicators may be described in accordance with the systems and methods disclosed herein. More detail on various kinds of indicators that may be produced by electronic device A 102a is given herein. For example, the encoder 104 may identify a leading picture with one or more indicators. Further detail is given below. It should be noted that the leading picture indicator module 108 may be included within the encoder 104 in some configurations. The leading picture indicator module 108 may enable reduced processing of a bitstream by one or more electronic devices 102a-b.

The encoder 104 (and leading picture indicator module 108, for example) may produce a bitstream 114. The bitstream 114 may include encoded data based on the input picture 106. In one example, the bitstream 114 may include encoded picture data. In some configurations, the bitstream 114 may also include overhead data, such as slice header information, PPS information, SPS information, APS information etc. In some cases, a slice header, PPS information, SPS information or APS information may be referred to as high-level syntax. The bitstream 114 may also include other data, some examples of which are described herein. As additional input pictures 106 are encoded, the bitstream 114 may include one or more leading pictures. Additionally or alternatively, the bitstream 114 may include one or more leading picture indicators and other encoded data.

The bitstream 114 may be provided to a decoder 112. In one example, the bitstream 114 may be transmitted to electronic device B 102b using a wired or wireless link. In some cases, this may be done over a network, such as the Internet, Local Area Network (LAN) or other type of network for communicating between devices. As illustrated in FIG. 1, the decoder 112 may be implemented on electronic device B 102b separately from the encoder 104 on electronic device A 102a. It should be noted that in some configurations, the encoder 104 and decoder 112 may be implemented on the same electronic device. In an implementation where the encoder 104 and decoder 112 are implemented on the same electronic device, for instance, the bitstream 114 may be made available to the decoder in a variety of ways. For example, the bitstream 114 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may obtain (e.g., receive) the bitstream 114. The decoder 112 may generate one or more decoded pictures 118 based on the bitstream 114. A decoded picture 118 may be displayed, played back, stored in memory, and/or transmitted to another device, etc.

The decoder 112 may include a leading picture determination module 120. The leading picture determination module 120 may enable electronic device B 102b to identify whether a leading picture is present in a bitstream 114. For example, the leading picture determination module 120 may determine whether a leading picture is present based on whether the bitstream 114 includes a leading picture indicator. Additionally or alternatively, the leading picture determination module 120 may determine whether a leading picture is present based on a leading picture absence indicator. The leading picture determination module 120 is described in greater detail below.

Electronic device B 102b may also perform one or more operations on the bitstream 114. In one example, an operation or process performed on the bitstream 114 may be based on whether a leading picture or leading picture indicator is present or not. In some configurations, the decoder 112 or other element on electronic device B 102b may perform the operation on the bitstream 114. In some configurations, an operation performed on the bitstream 114 may include discarding a leading picture or transmitting a decoded bitstream 114. Furthermore, other operations may also be performed on the bitstream 114.

In some configurations, electronic device B 102b may output a decoded picture 118. In one example, the decoded picture 118 may be transmitted to another device or back to electronic device A 102a. In one configuration, the decoded picture 118 may be stored or otherwise maintained on electronic device B 102b. In another example, electronic device B 102b may display the decoded picture 118. In other configurations, the decoded picture 118 may include elements of the input picture 106 with different properties based on the encoding and other operations performed on the bitstream 114. In some configurations, the decoded picture 118 may be included in a picture stream with a different resolution, format, specifications or other attribute from the input picture 106.

It should be noted that in some configurations or instances, the bitstream 114 may be provided to a processing device (e.g., network node). For instance, a processing device (e.g., network node) may be one example of electronic device B 102b. For example, a processing device may include a decoder. Alternatively, a processing device may be a separate device intervening between electronic device A 102b and electronic device B 102b. For example, a processing device may receive the bitstream 114 and relay it to electronic device B 102b. In some cases or configurations, a processing device or electronic device 102*b* may include a leading picture determination module 120 to determine whether leading pictures are present in a bitstream 114. In some cases or configurations, a processing device or electronic device B 102*b* may discard leading pictures from the bitstream 114.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application specific integrated circuit (ASIC), a large-scale integrated circuit (LSI) or integrated circuit, etc.

Figure 2:
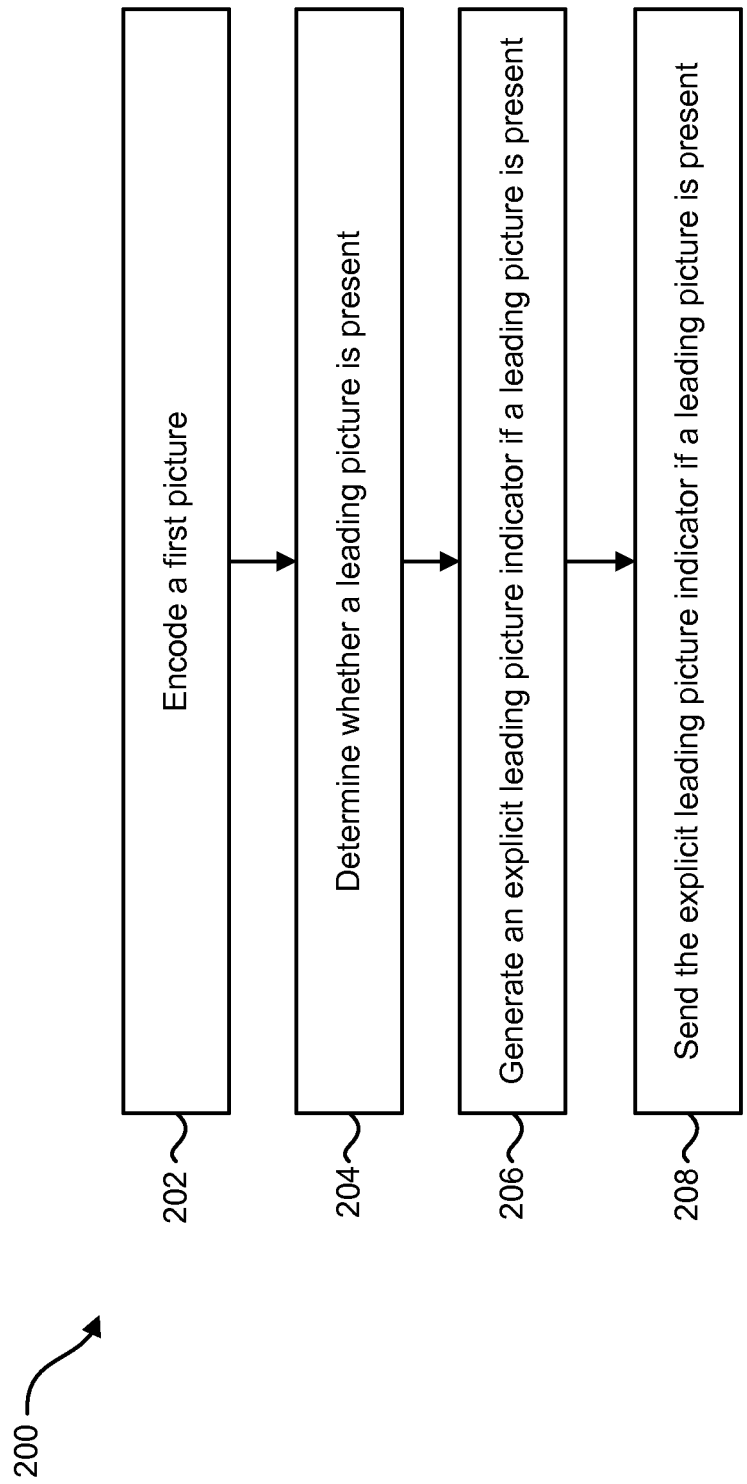
FIG. 2 is a flow diagram illustrating one configuration of a method for identifying a leading picture.

FIG. 2 is a flow diagram illustrating one configuration of a method 200 for identifying a leading picture. An electronic device 102 may encode 202 a first picture. The first picture may be an input picture 106 or one of a stream of input pictures 106 obtained by an electronic device 102. In some cases, the first picture may be a CRA picture. In other cases, a picture other than the first picture may be a CRA picture. For example, in one configuration, the CRA picture may be a picture that occurs at a random access point. The random access point may be any point in a stream of data (e.g., bitstream) where decoding of the bitstream can be started. One benefit of having a CRA picture that occurs at a random access point is being able to determine whether a leading picture is present in the bitstream subsequent to the CRA picture. Knowing the position of a leading picture relative to a CRA picture may be beneficial whether the CRA picture is the first picture or whether the CRA picture is at a random access point. Additionally, in some configurations, an indicator corresponding to the CRA picture may indicate whether one or more leading pictures follow the CRA picture. In some configurations, the electronic device 102 may encode multiple input pictures 106.

Encoding 202 the first picture may include representing an input picture 106 as digital data. For example, encoding 202 the first picture may include generating a string of bits that represent characteristics (e.g., color, luminance, spatial location, etc.) of an input picture 106. In some cases, an input picture 106 may be encoded 202 as a CRA picture. One or more encoded pictures may be included in the bitstream 114 and may be sent to another electronic device 102 that includes a decoder 112.

The electronic device 102 may determine 204 whether a leading picture is present. A leading picture may be a picture that follows a CRA picture in decoding order and precedes the CRA picture in output order. For example, a leading picture may be present if a picture is specified by the encoder 104 to follow a CRA picture in decoding order and to precede the CRA picture in output order (e.g., order output from the decoder 112).

Determining 204 whether a leading picture is present may be accomplished in accordance with one or more approaches. In one approach, the electronic device 102 determines 204 that a leading picture is present if the first picture is a CRA picture and another picture is present that is specified (by the encoder 104, for example) to follow the CRA picture in decoding order and precede the CRA picture in output order. In some configurations, the electronic device 102 may read data corresponding to the CRA picture and one or more other pictures to determine whether a leading picture is present. For instance, the electronic device 102 may read data that specifies decoding order and output order of the CRA picture and one or more other pictures.

In some configurations, output order may be determined by the POC while the decoding order may be determined by the order in which syntax elements appear in the bitstream 114. The output order is the order in which the decoded pictures are output from the electronic device 102. In some configurations, the output order may be the order in which the decoded pictures are output from a decoded picture buffer. In cases where the decoded pictures are to be output from the decoded picture buffer, the output order of a picture may be specified by the POC regardless of whether the picture is to be output. Further, the decoding order is the order in which syntax elements are processed by the decoding process. If the conditions are met that a picture is designated to follow the CRA picture in decoding order and is designated to precede the CRA picture in output order, the electronic device 102 may determine 204 that a leading picture is present.

The electronic device 102 may generate 206 an explicit leading picture indicator if a leading picture is present. In some configurations, the electronic device 102 may include a leading picture indicator module 108 that generates one or more explicit leading picture indicators. In one example, a leading picture indicator module 108 may be included as part of an encoder 104 on the electronic device 104. One benefit of generating an explicit leading picture indicator may include reducing unnecessary processing by a decoder.

One or more approaches may be followed to generate 206 an explicit leading picture indicator. In one approach, the leading picture indicator module 108 may generate a leading picture indicator by modifying or creating a NAL unit type corresponding to a CRA picture. For example, the NAL unit type may be associated with the first picture encoded by the electronic device 102. For instance, the NAL unit type may correspond to a CRA picture. In some configurations, the NAL unit type may be an explicit indicator that indicates a coded slice of a CRA picture with one or more subsequent leading pictures. One benefit of creating or modifying a NAL unit that explicitly indicates a leading picture is that additional decoding may not be required (of a processing device, network node or decoder, for example) to identify a leading picture. Another benefit may be that in a configuration where only a NAL unit type is used to explicitly indicate a leading picture, the SPS, PPS or other field of a CRA picture may not need to be modified.

By way of example, one configuration of an electronic device 102 generating an explicit leading picture indicator to indicate the presence of a leading picture may be explained with reference to Table 1. In one example, if a NAL unit type is equal to 4 for a NAL unit containing a slice of a particular picture, all VCL NAL units of that particular picture may have a NAL unit type equal to 4. In this example, a NAL unit type equal to 4 may indicate a coded slice of a CRA picture with one or more subsequent leading pictures (following the CRA picture, for example).

In additional or alternative approaches, the electronic device 102 may generate 206 an explicit leading picture indicator by generating a flag. For example, the electronic device 102 may generate a flag in one or more of an SPS, PPS, APS and a slice header for a CRA picture indicating whether one or more leading pictures follow a CRA picture. For example, the electronic device 102 may insert a flag into one or more slice headers of the CRA picture if it is determined that a leading picture follows the CRA picture.

More detailed examples of generating 206 an explicit leading picture indicator are given hereafter. In one example, the electronic device 102 may create or modify a flag or other indicator to accompany the syntax structure of one or more pictures (e.g., first picture). For instance, the leading picture indicator module 108 may indicate the presence of a leading picture by inserting a flag into the SPS, PPS, APS or slice header of a CRA picture. In some cases, the flag may be encoded or sent at a random access point or slice header of a CRA picture to indicate if leading pictures are present following a CRA picture.

In one example, the leading picture indicator module 108 may generate a flag in a SPS. This leading picture indicator may be an explicit indicator encoded as part of the SPS. By way of example, Table 6 illustrates one configuration of a flag that may be generated by the leading picture indicator module 108 and included in the SPS. In one configuration, a leading picture flag (e.g., cra_leadingpict_present_flag) equal to 1 may indicate that there is a leading picture in a bitstream 114 following a CRA picture. An example of a flag in the SPS is denoted in bold.

TABLE 6

```
seq_parameter_set_rbsp( ) {
    profile_idc
    reserved_zero_8bits /* equal to 0 */
    level_idc
    ...
    cra_leadingpict_present_flag
    ...
    rbsp_trailing_bits( )
}
```

In this example, profile_idc and level_idc may indicate the profile and level to which the coded video sequence conforms. The field reserved_zero_8 bits is equal to zero, indicating that the decoder shall ignore the value of reserved_zero_8 bits. The field denoted by seq_parameter_set_id may identify the sequence parameter set that is referred to by the picture parameter set. The value of seq_parameter_set_id shall be in the range of 0 to 31, inclusive.

Further for the field rbsp_trailing_bits, one example of the syntax may be as shown in Table 7 below:

TABLE 7

```
rbsp_trailing_bits( ) {
    rbsp_stop_one_bit /* equal to 1 */
    while( !byte_aligned( ) )
    rbsp_alignment_zero_bit /* equal to 0 */
}
```

In this example, rbsp_byte[i] is the i-th byte of an RBSP. An RBSP may be specified as an ordered sequence of bytes (SODB). The SODB of the RBSP may include a variety of arrangements. For example, if the SODB is empty (i.e., zero bits in length), the RBSP may also be empty. If the SODB is not empty, the first byte of the RBSP may contain the most significant or left-most eight bits of the SODB with the next byte of the RBSP containing the next eight bits of the SODB and so forth until fewer than eight bits of the SODB remain. Further, the rbsp_trailing_bits( ) may be present after the SODB. In this example, the first bits of the final RBSP byte may include any remaining bits of the SODB. The next bit may include a single rbsp_stop_one_bit equal to 1. When the rbsp_stop_one_bit is not the last bit of a byte-aligned byte, one or more rbsp_alignment_zero_bit may be present to result in byte alignment. Further one or more cabac_zero_word 16-bit syntax elements equal to 0x0000 may be present in some RBSPs after the rbsp_trailing_bits( ) at the end of the RBSP.

Additionally or alternatively, the leading picture indicator module 108 may generate a flag in the PPS. For example, this leading picture indicator may be an explicit indicator included as part of the PPS. By way of example, Table 8 illustrates one configuration of a code that includes a flag that may be generated by the leading picture indicator module 108 and included in the PPS. In one example, a leading picture flag (e.g., cra_leadingpict_present_flag) equal to 1 may indicate that there is a leading picture in a bitstream 114 following a CRA picture. An example of a flag in the PPS is denoted in bold.

TABLE 8

```
pic_parameter_set_rbsp( ) {
    pic_parameter_set_id
    seq_parameter_set_id
    ...
    cra_leadingpict_present_flag
    pps_extension_flag
    if( pps_extension_flag )
        while( more_rbsp_data( ) )
            pps_extension_data_flag
    rbsp_trailing_bits( )
}
```

In this example, the pic_parameter_set_id may identify the picture parameter set that is referred to in the slice header. Further, the value of the pic_parameter_set_id may in the range of 0 to 255, inclusive. The seq_parameter_set_id may refer to the active sequence parameter set. Further, the value of seq_parameter_set_id may be in the range of 0 to 31, inclusive. The pps_extension_flag may be equal to 0 in bitstreams conforming to HEVC Recommendation|International Standard. The value of 1 for pps_extension_flag may be reserved for future use by ITU-T|ISO/IEC. Decoders shall ignore all data that follow the value 1 for pps_extension_flag in a picture parameter set NAL unit. The pps_extension_data_flag may have any value and does not affect decoder conformance to profiles specified in HEVC Recommendation|International Standard.

Additionally or alternatively, the leading picture indicator module 108 may generate a flag in an APS. This leading picture indicator may be an explicit indicator included as part of the APS. By way of example, Table 9 illustrates one configuration of a code that includes a flag that may be generated by the leading picture indicator module 108 and included in the APS. In one example, a leading picture flag (e.g., cra_leadingpict_present_flag) equal to 1 may indicate that there is a leading picture in a bitstream 114 following a CRA picture. An example of a flag in the APS is denoted in bold. As further explanation, the APS identification tag (aps_id) may also include data corresponding to the slice header of a picture. In some configurations, the value of aps_id may be in the range of 0 to a predetermined limit, inclusive.

TABLE 9

```
aps_rbsp( ) {
    aps_id
    aps_scaling_list_data_present_flag
    if( aps_scaling_list_data_present_flag )
        scaling_list_param( )
    aps_deblocking_filter_flag
    if(aps_deblocking_filter_flag) {
        disable_deblocking_filter_flag
        if( !disable_deblocking_filter_flag ) {
            beta_offset_div2
            tc_offset_div2
        }
```

TABLE 9-continued

```
    }
    aps_sao_interleaving_flag
    if( !aps_sao_interleaving_flag ) {
        aps_sample_adaptive_offset_flag
        if( aps_sample_adaptive_offset_flag )
            aps_sao_param( )
    }
    aps_adaptive_loop_filter_flag
    if( aps_adaptive_loop_filter_flag )
        alf_param( )
    cra_leadingpict_present_flag
    aps_extension_flag
    if( aps_extension_flag )
        while( more_rbsp_data( ) )
            aps_extension_data_flag
    rbsp_trailing_bits( )
}
```

In this example, aps_id may identify the adaptation parameter set that is referred to in the slice header. The value of aps_id may be in the range of 0 to TBD, inclusive. An aps_s-caling_list_data_present_flag equal to 1 may indicate that the scaling list parameters exist in the APS. An aps_scaling_list_data_present_flag equal to 0 may indicate that scaling list parameters do not exist in the APS. The aps_deblocking_filter_flag equal to 1 may specify that deblocking parameters are present in the APS. The aps_deblocking_filter_flag equal to 0 may specify that deblocking parameters do not exist in the APS. The aps_sao_interleaving_flag equal to 1 may specify that the SAO parameters are interleaved in the slice data for slices referring to the current APS. The aps_sao_interleaving_flag equal to 0 may specify that the SAO parameters are in the APS for slices referring to the current APS. When there is no active APS, aps_sao_interleaving_flag may be inferred to be 0. The aps_sample_adaptive_offset_flag equal to 1 may specify that the SAO is on for slices referring to the current APS. The aps_sample_adaptive_offset_flag equal to 0 may specify that the SAO is off for slices referring to the current APS. When there is no active APS, the aps_sample_adaptive_offset_flag value may be inferred to be 0. The aps_adaptive_loop_filter_flag equal to 1 may specify that the adaptive loop filter (ALF) is on for slices referring to the current APS. The aps_adaptive_loop_filter_flag equal to 0 may specify that the ALF is off for slices referring to the current APS. When there is no active APS, the aps_adaptive_loop_filter_flag value may be inferred to be 0. The aps_extension_flag equal to 0 may specify that no aps_extension_data_flag syntax elements are present in the picture parameter set RBSP syntax structure. The aps_extension_flag may be equal to 0 in bitstreams conforming to HEVC Recommendation|International Standard. The value of 1 for an aps_extension_flag may be reserved for future use by ITU-T|ISO/IEC. Decoders may ignore all data that follow the value 1 for an aps_extension_flag in a picture parameter set NAL unit. The aps_extension_data_flag may have any value and may not affect decoder conformance to profiles specified in HEVC Recommendation|International Standard.

Additionally or alternatively, the leading picture indicator module 108 may generate a flag in a slice header associated of a CRA picture or a leading picture. This leading picture indicator may be an explicit indicator included as part of a slice header. By way of example, Table 10 illustrates one configuration of a code that includes a flag that may be generated by the leading picture indicator module 108 and included as part of a slice header. In one example, a leading picture flag (e.g., cra_leadingpict_present_flag) equal to 1 may indicate that there is a leading picture in a bitstream 114 following a CRA picture or other picture associated with the flag. An example of a flag in the slice header is denoted in bold.

TABLE 10

```
slice_header( ) {
    first_slice_in_pic_flag
    if( first_slice_in_pic_flag = = 0 )
        slice_address
    ...
    cra_leadingpict_present_flag
    ...
}
```

In this example, the first_slice_in_pic_flag may indicate whether the slice is the first slice of a picture. If the first_slice_in_pic_flag is equal to 1, the variables SliceCbAddrZS and Slice CtbAddrRS may both be set to 0 and the decoding may start with the first coding treeblock in the picture. The slice_address may specify the address in slice granularity resolution in which the slice starts. In one example, the length of the slice_address syntax element may be equal in bits to the following:

(Ceil(Log 2(PicWidthInCtbs*PicHeightInCtbs))+ SliceGranularity).

The variable SliceCtbAddrRS may specify the coding treeblock in which the slice starts in coding treeblock raster scan order, is derived as follows:

SliceCtbAddrRS=(slice address>>SliceGranularity).

The variable SliceCbAddrZS may specify the address of a first coding block in the slice in minimum coding block granularity in z-scan order, and may be derived as follows:

SliceCbAddrZS = slice_address, and
slice_address << ((log2 diff max min coding block size − SliceGranularity) << 1 ).

The slice decoding may start with the largest coding unit possible at the slice starting coordinate.

It should be noted that the tables above and accompanying explanations show one possible location where a cra_leadingpict_present_flag may be included. In other configurations, one or more flags may be sent at different locations of the SPS, PPS, APS or slice header.

Additionally or alternatively, a leading picture indicator module 108 may modify or create a NAL unit type corresponding to one or more leading pictures. For example, a NAL unit type corresponding to a leading picture may indicate a leading picture. For instance, a NAL unit type may indicate a coded slice of a leading picture following a CRA picture. In one configuration, the coded slice of the leading picture may also include a reference to a CRA picture.

The electronic device 102 may send 208 the explicit leading picture indicator if a leading picture is present. Sending 208 the explicit leading picture indicator may include transferring data (e.g., a bitstream 114) between components of an electronic device 102 or transmitting a bitstream 114 between one or more electronic devices 102. In one example, an encoder 104 on electronic device A 102a may send a bitstream 114 including one or more leading picture indicators to electronic device B 102b. In some configurations, the bitstream 114 may be sent to a decoder 120 on electronic device B 102b. The explicit leading picture indicator may be sent 208 via a wired or wireless transmission, for example.

Figure 3:
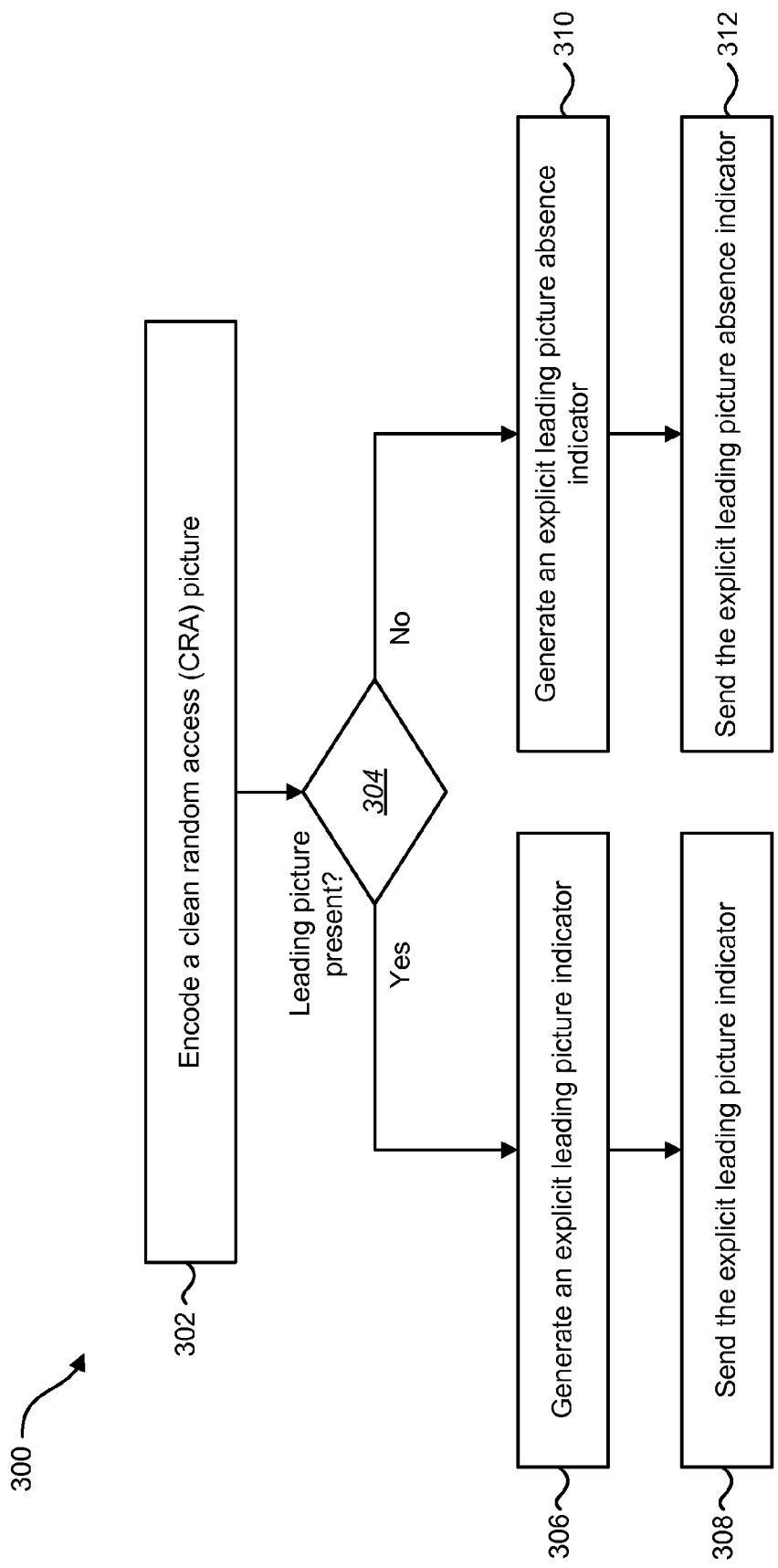
FIG. 3 is a flow diagram illustrating a more specific configuration of a method for identifying a leading picture.

FIG. 3 is a flow diagram illustrating a more specific configuration of a method 300 for identifying a leading picture. An electronic device 102 may encode 302 a CRA picture. For example, the electronic device 102 may encode 302 an input picture 106 as a CRA picture. For instance, the electronic device 102 may encode 302 a CRA picture as described above in connection with FIG. 2. It should also be noted that while some configurations may indicate a CRA picture corresponding to one or more leading picture indicators, a leading picture indicator may correspond to other types of pictures. For example, many of the proposed approaches for providing a leading picture indicator may be applied to an instantaneous decoding refresh (IDR) picture. In one configuration, a IDR picture may be a coded picture for which a variable IdrPicFlag is equal to 1. An IDR picture may cause the decoding process to mark all reference pictures as "unused for reference." Further, all coded pictures that follow an IDE picture in decoding order may be decoded without inter-prediction from any picture that precedes the IDR picture in decoding order. In some configurations, the first picture of each coded video sequence or stream of pictures may be an IDR picture.

Encoding 302 the CRA picture may include representing an input picture 106 as digital data. For example, encoding 302 the first picture may include generating a string of bits that represent characteristics (e.g., color, luminance, spatial location, etc.) of an input picture 106. One or more encoded pictures may be included in the bitstream 114 and may be sent to another electronic device 102 that includes a decoder 112.

The electronic device 102 may determine 304 whether a leading picture is present. A leading picture may be a picture that follows a CRA picture in decoding order and precedes the CRA picture in output order. For example, a leading picture may be present if a picture is specified by the encoder 104 to follow a CRA picture in decoding order and to precede the CRA picture in output order (e.g., order output from the decoder 112). The electronic device 102 may determine 304 whether a leading picture is present as described above in connection with FIG. 2, for instance.

If a leading picture is present, the electronic device 102 may generate 306 an explicit leading picture indicator. The electronic device 102 may generate 306 the explicit leading picture indicator in accordance with one or more approaches. For example, the electronic device 102 may generate 306 one or more of a NAL unit type, a flag in an SPS, a flag in a PPS, a flag in an APS and a flag in a slice header of the CRA picture that indicates or indicate that a leading picture is present (e.g., that one or more leading pictures follow the CRA picture). In other words, examples of the explicit leading picture indicator include one or more of a NAL unit type, a flag in an SPS, a flag in a PPS, a flag in an APS and a flag in a slice header of the CRA picture.

In one approach, the electronic device 102 may generate 306 a NAL unit type corresponding to a CRA picture. For example, the electronic device 102 may generate 306 a NAL unit type 4 as illustrated in Table 1 above. This NAL unit type 4 may indicate a coded slice of a CRA picture with one or more subsequent leading pictures.

In additional or alternative approaches, the electronic device 102 may generate 306 a flag in one or more of an SPS, PPS, APS and a slice header of the CRA picture. For example, the electronic device 102 may generate 306 one or more cra_leadingpict_present_flags with a value of 1 in one or more of the SPS, PPS, APS and a slice header of the CRA picture as described above. For instance, a cra_leadingpict_present_flag with a value of 1 may indicate the presence of one or more leading pictures following the CRA picture. It should be noted that only one of the approaches described may be implemented or a combination of two or more of the approaches described may be implemented in order to explicitly indicate that one or more leading pictures follow the CRA picture.

The electronic device 102 may send 308 the explicit leading picture indicator. In some configurations, sending the explicit leading picture indicator may include transferring data (e.g., a bitstream 114) between components of an electronic device 102 or transferring a bitstream 114 between one or more electronic devices. In one example, an encoder 104 on electronic device A 102a may send a bitstream 114 including one or more leading picture indicators to electronic device B 102b or a decoder 112 on electronic device B 102b.

If the electronic device 102 determines that a leading picture is not present, a leading picture indicator module 108 may generate 310 an explicit leading picture absence indicator. The electronic device 102 may generate 310 the explicit leading picture absence indicator in accordance with one or more approaches. For example, the electronic device 102 may generate 310 one or more of a NAL unit type, a flag in an SPS, a flag in a PPS, a flag in an APS and a flag in a slice header of the CRA picture that indicates or indicate that a leading picture is absent (e.g., does not follow the CRA picture). In other words, examples of the explicit leading picture absence indicator include one or more of a NAL unit type, a flag in an SPS, a flag in a PPS, a flag in an APS and a flag in a slice header of the CRA picture.

In one approach, the electronic device 102 may generate 310 a NAL unit type corresponding to a CRA picture. For example, the electronic device 102 may generate 310 a NAL unit type 16 as illustrated in Table 1 above. This NAL unit type 16 may indicate a coded slice of a CRA picture with no subsequent leading pictures.

In additional or alternative approaches, the electronic device 102 may generate 310 a flag in one or more of an SPS, PPS, APS and a slice header of the CRA picture. For example, the electronic device 102 may generate 310 one or more cra_leadingpict_present_flags with a value of 0 in one or more of the SPS, PPS, APS and a slice header of the CRA picture as described above. For instance, a cra_leadingpict_present_flag with a value of 0 may indicate the absence of one or more leading pictures following the CRA picture. It should be noted that only one of the approaches described may be implemented or a combination of two or more of the approaches described may be implemented in order to explicitly indicate that no leading pictures follow the CRA picture.

The electronic device 102 may send 312 the explicit leading picture absence indicator if a leading picture is not present. Sending 312 the explicit leading picture absence indicator may include transferring data between components of an electronic device 102 or transmitting a bitstream 114 between one or more electronic devices 102 or between components (e.g., encoder 104, decoder 112) on multiple devices. One benefit of providing an explicit leading picture indicator or an absence indicator may include reducing one or more decoding steps for determining whether a leading picture is present in a bitstream 114. Also, providing an absence indicator may reduce additional operations performed on a bitstream 114 as it passes through an electronic device 102.

Figure 4:
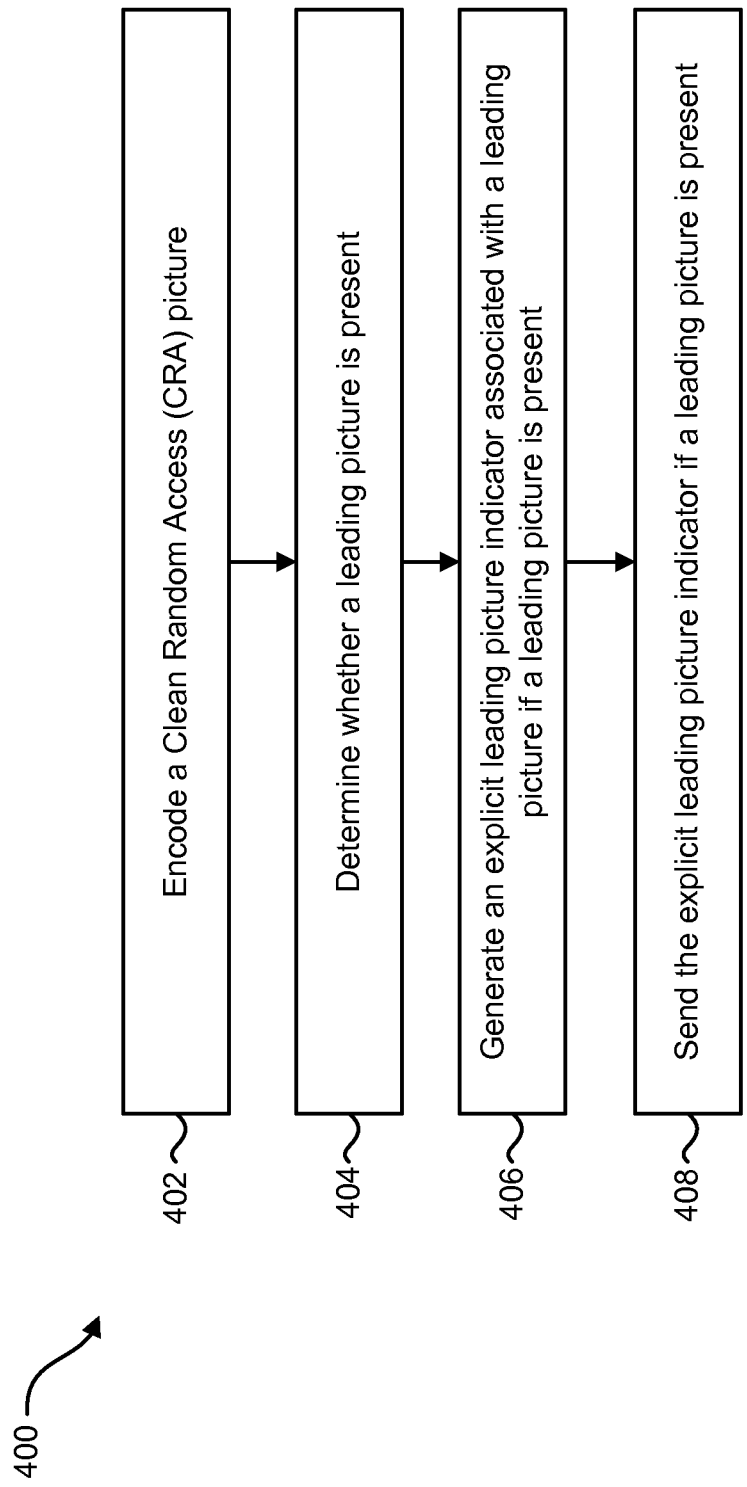
FIG. 4 is a flow diagram illustrating one configuration of a method for identifying a leading picture.

FIG. 4 is a flow diagram illustrating one configuration of a method 400 for identifying a leading picture. An electronic device 102 may encode 402 a CRA picture. For example, the electronic device 102 may encode an input picture 106 as a CRA picture. For instance, the electronic device 102 may encode 402 a CRA picture as described above in connection with FIG. 2.

The electronic device 102 may determine 404 whether a leading picture is present. A leading picture may be a picture that follows a CRA picture in decoding order and precedes the CRA picture in output order. For example, a leading picture may be present if a picture is specified by the encoder 104 to follow a CRA picture in decoding order and to precede the CRA picture in output order (e.g., order output from the decoder 112). The electronic device 102 may determine 404 whether a leading picture is present as described above in connection with FIG. 2, for instance.

The electronic device 102 may generate 406 an explicit leading picture indicator associated with a leading picture if a leading picture is present. In some configurations, the electronic device 102 may generate 406 an explicit leading picture indicator associated with a leading picture by creating a NAL unit type corresponding to one or more leading pictures. For example, the electronic device 102 may generate 406 a NAL unit type 15 as illustrated in Table 11.

TABLE 11

| nal_unit_type | Content of NAL unit and RBSP syntax structure | NAL unit type class |
|---|---|---|
| 0 | Unspecified | non-VCL |
| 1 | Coded slice of a non-IDR, non-CRA and non-TLA picture slice_layer_rbsp( ) | VCL |
| 2 | Reserved | n/a |
| 3 | Coded slice of a TLA picture slice_layer_rbsp( ) | VCL |
| 4 | Coded slice of a CRA picture slice_layer_rbsp( ) | VCL |
| 5 | Coded slice of an IDR picture slice_layer_rbsp( ) | VCL |
| 6 | SEI sei_rbsp( ) | non-VCL |
| 7 | Sequence parameter set seq_parameter_set_rbsp( ) | non-VCL |
| 8 | Picture parameter set pic_parameter_set_rbsp( ) | non-VCL |
| 9 | Access unit delimiter access_unit_delimiter_rbsp( ) | non-VCL |
| 10-11 | Reserved | n/a |
| 12 | Filler data filler_data_rbsp( ) | non-VCL |
| 13 | Reserved | n/a |
| 14 | Adaptation parameter set aps_rbsp( ) | non-VCL |
| 15 | Coded slice of a leading picture following a CRA picture slice_layer_rbsp( ) | VCL |
| 16-23 | Reserved | n/a |
| 24-63 | Unspecified | Non-VCL |

For example, NAL unit type 15 may indicate a coded slice of a leading picture following a CRA picture. For instance, if a NAL unit type is equal to 15 for a NAL unit containing a slice of a particular picture, all VCL NAL units of that particular picture may have a NAL unit type equal to 15. In this example, a NAL unit type equal to 15 may indicate a coded slice of a leading picture following a CRA picture. One benefit of generating an explicit leading picture indicator in this approach may include facilitating the identification of a leading picture indicator without modifying the CRA picture or other data associated with the CRA picture. Further, the leading picture indicator may be obtained (by a decoder or network node, for example) without decoding the SPS, PPS or other fields associated with a CRA picture or other picture. In some configurations, the leading picture indicator corresponding to a leading picture may be included in one or more of the SPS, PPS, APS or slice headers associated with one or more leading pictures.

The electronic device 102 may send 408 the explicit leading picture indicator if a leading picture is present. Sending the explicit leading picture indicator may include transferring data (e.g., a bitstream 114) between components of an electronic device 102 or transmitting a bitstream 114 between one or more electronic devices 102. Further, sending an explicit leading picture indicator may include other similar approaches for transferring data between one or more electronic devices 102.

Figure 5:
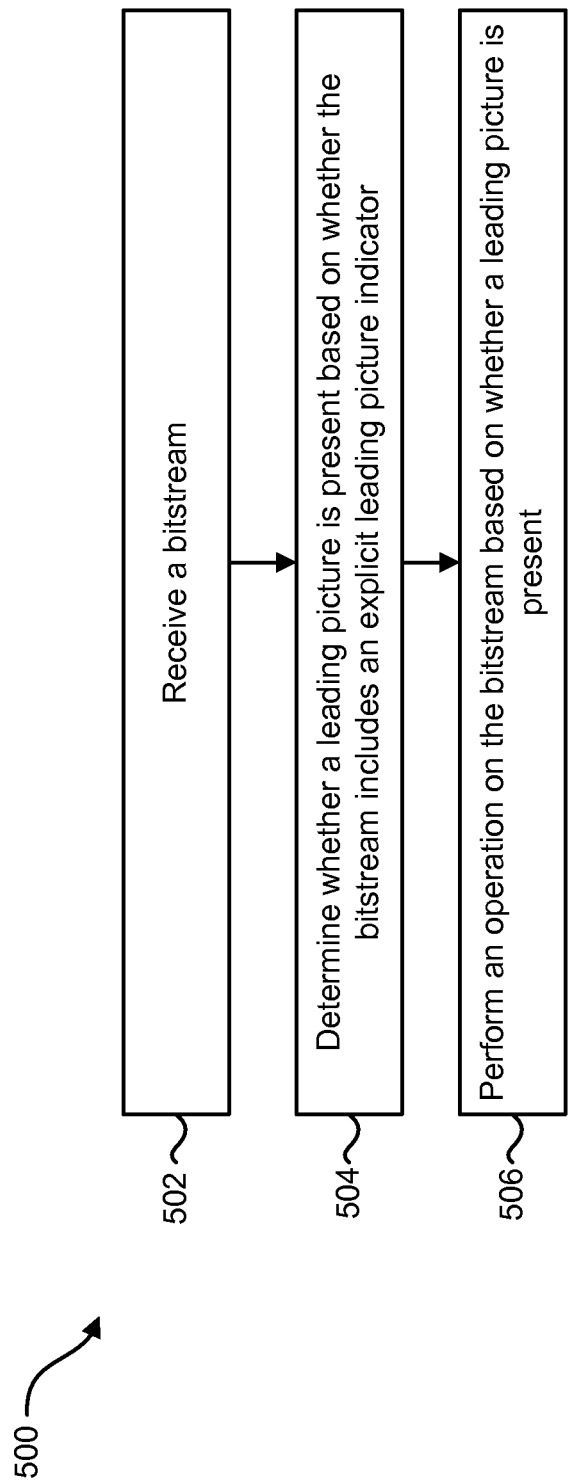
FIG. 5 is a flow diagram illustrating one configuration of a method for identifying a leading picture.

FIG. 5 is a flow diagram illustrating one configuration of a method 500 for identifying a leading picture. An electronic device 102 may receive 502 a bitstream 114. Receiving 502 a bitstream 114 may include obtaining, reading or otherwise accessing a bitstream 114. In some configurations, the bitstream 114 may be received from an encoder 104 on the same electronic device or on a different electronic device 102. In one example, electronic device B 102b may receive the bitstream 114 from an encoder 104 on electronic device A 102a. In some configurations, electronic device B 102b may also include a decoder 112 that receives the bitstream 114. The bitstream 114 may include encoded data based on one or more input pictures 106. In some configurations, the bitstream 114 may also include one or more of an explicit leading picture indicator and an explicit leading picture absence indicator.

The electronic device 102 may determine 504 whether a leading picture is present based on whether the bitstream 114 includes an explicit leading picture indicator. Additionally or alternatively, in some configurations, the electronic device 102 may determine the absence of a leading picture based on whether a bitstream 114 includes an explicit leading picture absence indicator. Benefits of providing either an explicit leading picture indicator or an explicit leading picture absence indicator may include reducing the amount of decoding or other processing steps an electronic device 102 may perform in determining whether a leading picture is present. In some configurations, where a leading picture indicator module 108 may determine either absence or presence of a leading picture, this may further reduce unnecessary operations by one or more electronic devices (e.g., decoder) on a bitstream 114.

Determining 504 whether a leading picture is present or absent may include reading or otherwise accessing the bitstream 114. Additionally or alternatively, in some configurations, an electronic device 102 may partially decode the bitstream 114. In one configuration, the decoder 112 may receive and read some or all of the bitstream 114 to determine whether a leading picture indicator is present or not. In one example, the decoder 112 may include a leading picture determination module 120 for reading a bitstream 114 and identifying whether a leading picture indicator is present or not. In some configurations, a leading picture determination module 120 may interface with a leading picture indicator module 108 to determine whether a leading picture indicator is present in the bitstream 114. In some configurations, the leading picture determination module 120 may determine whether a leading picture indicator is present by viewing a NAL unit type, one or more flags associated with one or more pictures, coded slices created or modified by the leading picture indicator module 108 or other explicit indicator that may indicate the presence or absence of a leading picture.

In one approach, the electronic device 102 may determine 504 whether a leading picture is present based on a NAL unit type corresponding to a CRA picture. For example, if the electronic device 102 receives a NAL unit type 4 as illustrated in Table 1 above, the electronic device 102 may determine 504 that one or more leading pictures are present (e.g., one or more leading pictures follow the CRA picture). Furthermore, if the electronic device 102 receives a NAL unit type 16, the electronic device 102 may determine 504 that no leading pictures are present.

In additional or alternative approaches, the electronic device 102 may determine 504 whether a leading picture is present based on one or more flags included in one or more of an SPS, PPS, APS and a slice header of a CRA picture. For example, if the electronic device 102 receives a cra_leading-pict_present_flag with a value of 1, the electronic device 102 may determine 504 that a leading picture is present (e.g., that one or more leading pictures follows a CRA picture). Furthermore, if the electronic device 102 receives a cra_leading-pict_present_flag with a value of 0, the electronic device 102 may determine 504 that a leading picture is absent (e.g., that no leading pictures follow a CRA picture). Accordingly, examples of explicit leading picture indicators may include one or more of a NAL unit type corresponding to a CRA picture and one or more flags corresponding to one or more of an SPS, PPS, APS and slice header of the CRA picture that may indicate the presence of one or more leading pictures.

Additionally or alternatively, the electronic device 102 may determine 504 whether a leading picture is present based on a NAL unit type corresponding to a leading picture. For example, if the electronic device 102 receives a NAL unit type of 15 as illustrated in Table 7 above, the electronic device 102 may determine 504 that that a leading picture is present (e.g., that one or more leading pictures follow a CRA picture). However, if the electronic device 102 does not receive a NAL unit type of 15 as illustrated in Table 7 above, the electronic device 102 may determine 504 that a leading picture is absent (e.g., that no leading pictures follow a CRA picture). Accordingly, another example of an explicit leading picture indicator is a NAL unit associated with a leading picture.

The electronic device 102 may perform 506 one or more operations on the bitstream 114 based on whether a leading picture is present. In some configurations, performing 506 an operation on the bitstream 114 may include discarding one or more leading pictures. For example, a processing device (e.g, network node) or decoder may discard one or more leading pictures from the bitstream 114. Other examples of operations that an electronic device 102 may perform 506 on the bitstream 114 may include reading, writing, reordering, deleting, decoding, sending or other operations performed by an electronic device 102 on data or pictures contained in a bitstream 114. Additionally or alternatively, performing 506 an operation on a bitstream 114 may be based on other factors, such as availability of bandwidth, capabilities of the electronic device 102, specifications and other properties of the bitstream 114.

In one example, an electronic device 102 may discard one or more leading pictures based on the presence or absence of an explicit leading picture indicator in addition to other factors associated with the electronic device 102 or bitstream 114. Additionally or alternatively, the electronic device 102 may discard one or more leading pictures based on other systems and methods associated with the prediction, compensation, estimation or other approaches for efficiently representing digital media. Other configurations may include other operations performed on the bitstream 114 by one or more electronic devices 102.

Figure 6:
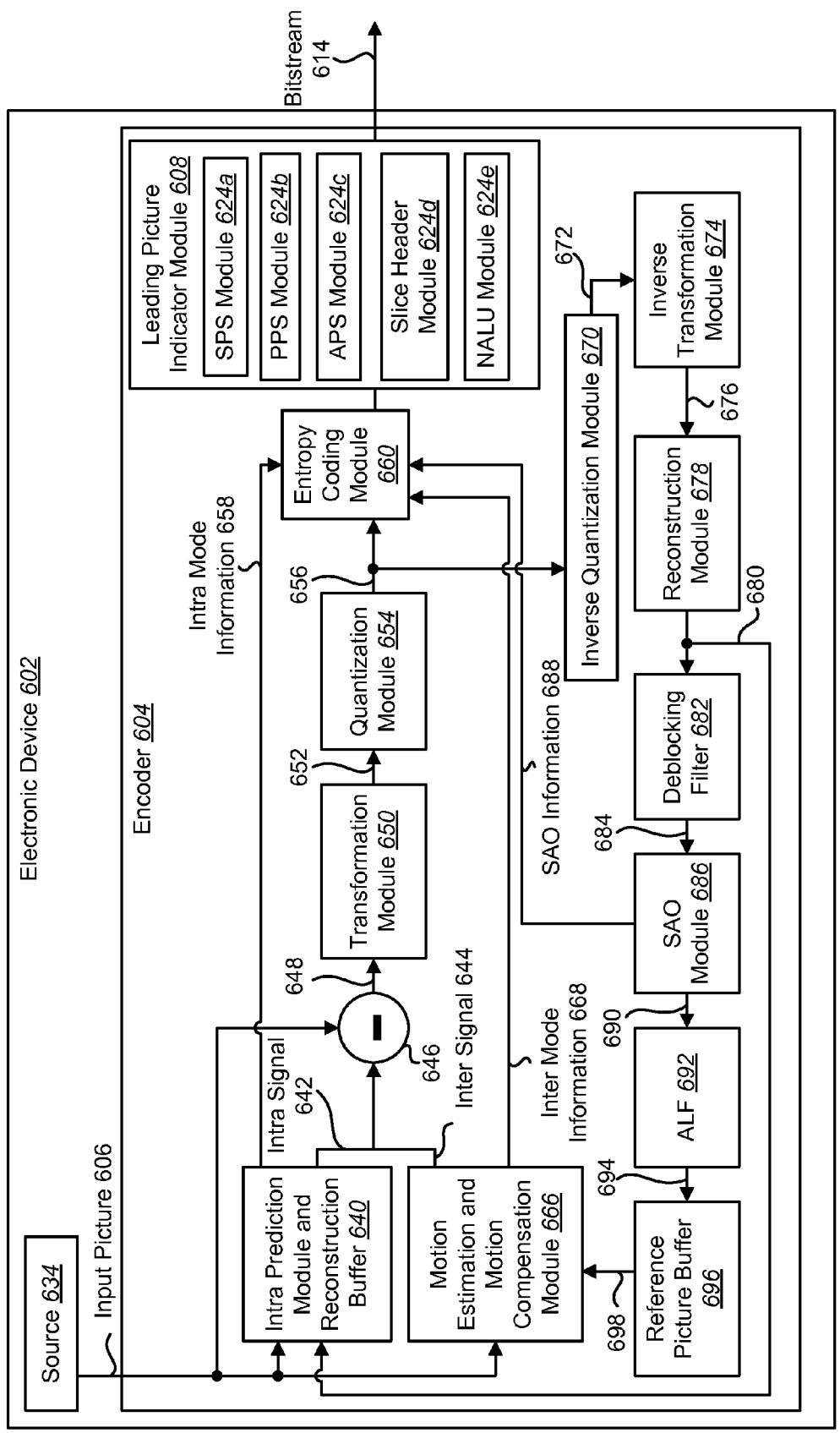
FIG. 6 is a block diagram illustrating one configuration of an encoder on an electronic device.

FIG. 6 is a block diagram illustrating one configuration of an encoder 602 on an electronic device 102. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be a HEVC coder.

The electronic device 602 may include a source 634. The source 634 may provide picture or image data (e.g., video) as an input picture 606 to the encoder 604. Examples of the source 634 may include image sensors, memory, communication interfaces, network interfaces, wireless receivers, ports, etc.

One or more input pictures 606 may be provided to an intra-frame prediction module and reconstruction buffer 640. An input picture 606 may also be provided to a motion estimation and motion compensation module 666 and to a subtraction module 646.

The intra-frame prediction module and reconstruction buffer 640 may generate intra mode information 658 and an intra signal 642 based on one or more input pictures 606 and reconstructed data 680. The motion estimation and motion compensation module 666 may generate inter mode information 668 and an inter signal 644 based on one or more input pictures 606 and a reference picture buffer 696 signal 698. In some configurations, the reference picture buffer 696 may include data from one or more reference pictures in the reference picture buffer 696.

The encoder 604 may select between the intra signal 642 and the inter signal 644 in accordance with a mode. The intra signal 642 may be used in order to exploit spatial characteristics within a picture in an intra coding mode. The inter signal 644 may be used in order to exploit temporal characteristics between pictures in an inter coding mode. While in the intra coding mode, the intra signal 642 may be provided to the subtraction module 646 and the intra mode information 358 may be provided to an entropy coding module 660. While in the inter coding mode, the inter signal 644 may be provided to the subtraction module 646 and the inter mode information 668 may be provided to the entropy coding module 660.

Either the intra signal 642 or the inter signal 644 (depending on the mode) is subtracted from an input picture 606 at the subtraction module 646 in order to produce a prediction residual 648. The prediction residual 648 is provided to a transformation module 650. The transformation module 650 may compress the prediction residual 648 to produce a transformed signal 652 that is provided to a quantization module 654. The quantization module 654 quantizes the transformed signal 652 to produce transformed and quantized coefficients (TQCs) 656.

The TQCs 656 are provided to an entropy coding module 660 and an inverse quantization module 670. The inverse quantization module 670 performs inverse quantization on the TQCs 656 to produce an inverse quantized signal 672 that is provided to an inverse transformation module 674. The inverse transformation module 674 decompresses the inverse quantized signal 672 to produce a decompressed signal 676 that is provided to a reconstruction module 678.

The reconstruction module 678 may produce reconstructed data 680 based on the decompressed signal 676. For example, the reconstruction module 678 may reconstruct (modify) pictures. The reconstructed data 680 may be provided to a deblocking filter 682 and to the intra prediction module and reconstruction buffer 640. The deblocking filter 682 may produce a filtered signal 684 based on the reconstructed data 680.

The filtered signal 684 may be provided to a sample adaptive offset (SAO) module 686. The SAO module 686 may produce SAO information 688 that is provided to the entropy coding module 660 and an SAO signal 690 that is provided to an adaptive loop filter (ALF) 692. The ALF 692 produces an ALF signal 694 that is provided to the reference picture buffer 696. The ALF signal 694 may include data from one or more pictures that may be used as reference pictures.

The entropy coding module 660 may code the TQCs 656 to produce a bitstream 614 or other signal. Also, the entropy coding module 660 may code the TQCs 656 using Context-Adaptive Variable Length Coding (CAVLC) or Context-Adaptive Binary Arithmetic Coding (CABAC). In particular, the entropy coding module 660 may code the TQCs 656 based on one or more of intra mode information 658, inter mode information 668 and SAO information 688. In some configurations, the bitstream 614 may include coded picture data. In one example, the bitstream 614 is passed to a leading picture indicator module 608 prior to being sent from the encoder 604 or to another electronic device 604.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 602 (e.g., the encoder 604) may determine the QP, resolution information and block type, which may be provided to the entropy coding module 660.

The entropy coding module 660 may determine the block size based on a block of TQCs 656. For example, block size may be the number of TQCs 656 along one dimension of the block of TQCs. In other words, the number of TQCs 656 in the block of TQCs may be equal to block size squared. For instance, block size may be determined as the square root of the number of TQCs 656 in the block of TQCs. Resolution may be defined as a pixel width by a pixel height. Resolution information may include a number of pixels for the width of a picture, for the height of a picture or both. Block size may be defined as the number of TQCs 656 along one dimension of a 2D block of TQCs.

In some configurations, the entropy coding module 660 sends a bitstream 614 or other signal including one or more pictures to a leading picture indicator module 608. The leading picture indicator module 608 may determine whether a leading picture is present in one or more input pictures 606 and generate a leading picture indicator associated with either a leading picture or other picture (e.g., CRA picture). In some configurations, the leading picture indicator module may generate a new NAL unit type, flag or other indicator to show the presence or absence of a leading picture. Further, the leading picture indicator module 608 may modify or create a leading picture indicator or absence indicator to accompany or send with a bitstream 614 of data to be stored on the electronic device or be sent to another electronic device.

The leading picture indicator module 608 may further include a variety of modules or sub-modules for generating one or more leading picture indicators associated with an input picture 606. For example, the indicator module 608 may include a SPS module 624a, PPS module 624b, APS module 624c, slice header module 624d, NAL Unit (NALU) module 624e or other module for generating an explicit leading picture indicator associated with an input picture 606 to indicate whether or not a leading picture is present in a stream of data. In some configurations, the leading picture indicator may be generated after a picture is partially encoded or passes through components of an electronic device 602. One benefit of this approach may include reducing extensive coding for determining and providing an indication of whether a leading picture is present.

In one configuration, the leading picture indicator module 608 may generate a flag or other indicator to indicate whether a leading picture is present. For example, the SPS module 624a may generate a flag in a SPS to correspond to the presence of one or more leading pictures. In another example, the PPS module 624b may generate a flag or other indicator in a PPS to correspond to the presence of one or more leading pictures. In another example, the APS module 624c may generate a flag in an APS to correspond to the presence of one or more leading pictures. In another example, the slice header module 624d may generate a flag or other indicator in a slice header (e.g., CRA slice header) to correspond to the presence or absence of one or more leading pictures. In some embodiments, one or more of the modules described herein may generate one or more indicators corresponding to one or more leading pictures.

Additionally or alternatively, in one configuration, the leading picture indicator module 608 may generate an explicit leading picture indicator associated with one or more input pictures 606 by creating or modifying a new NAL unit type. In one example, a NALU module 624e may generate a NAL unit associated with one or more pictures that indicates the presence of one or more leading pictures. In one configuration, the NAL unit may be associated with a CRA picture and the NALU module 624e may generate a NAL unit to indicate or point to one or more leading pictures to follow subsequent to the CRA picture. In some configurations, the NALU module 624e may generate a NAL unit associated with one or more leading pictures to indicate that an input picture 606 is a leading picture.

In another configuration, the leading picture indicator module 608 may generate an explicit leading picture absence indicator. In one example, the leading picture indicator module 608 may generate a NAL unit type associated with one or more input pictures 606 (e.g., CRA picture) to indicate the absence of a leading picture. In one example, the NAL unit type may include a coded slice of a CRA picture that indicates the absence of a leading picture following the CRA picture.

In some configurations, the bitstream 614 may be transmitted to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or other component on the electronic device 602.

Figure 7:
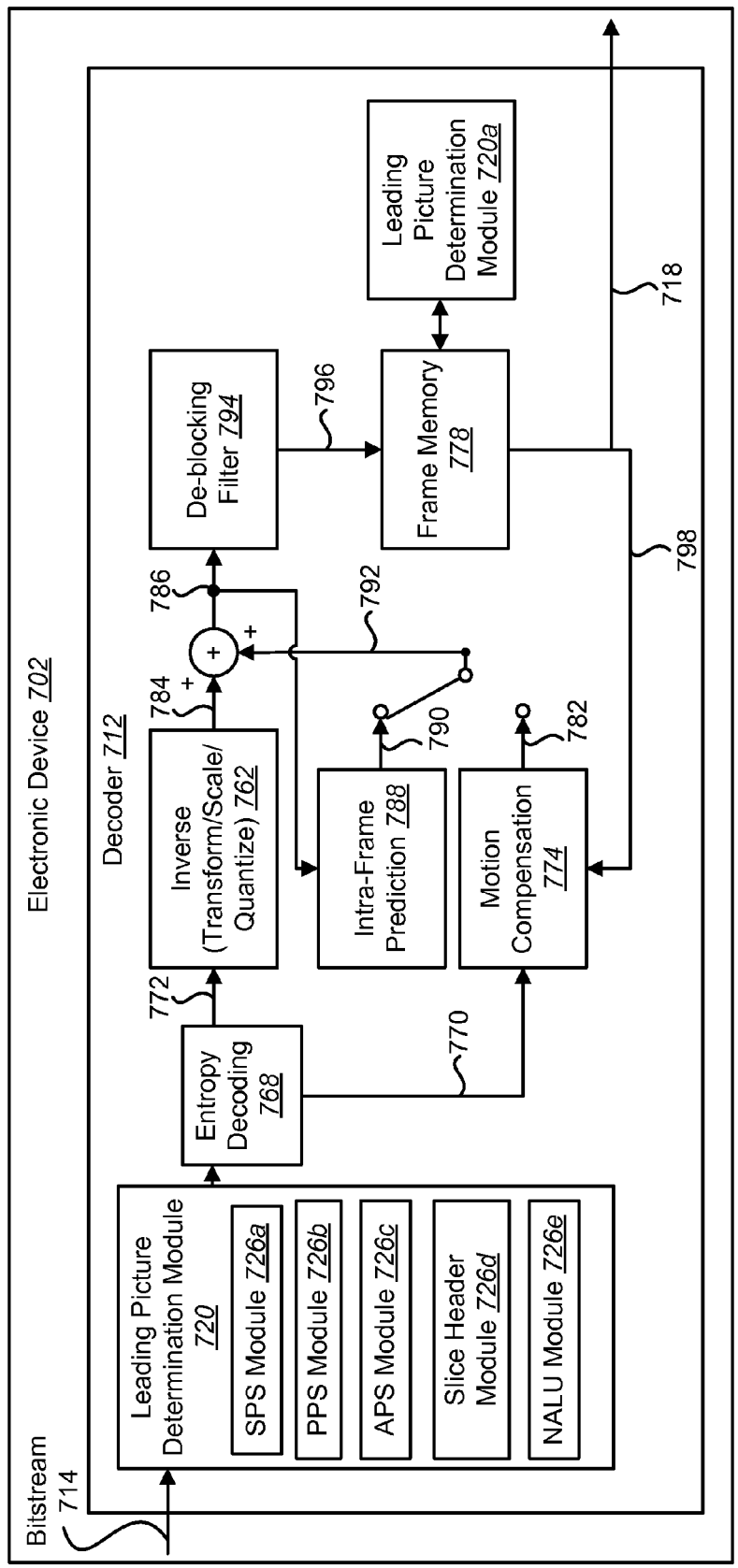
FIG. 7 is a block diagram illustrating one configuration of a decoder on an electronic device.

FIG. 7 is a block diagram illustrating one configuration of a decoder 712 on an electronic device 702. The decoder 712 may be included in an electronic device 702. For example, the decoder 712 may be a HEVC decoder. The decoder 712 and/or one or more of the elements illustrated as included in the decoder 712 may be implemented in hardware, software or a combination of both. The decoder 712 may receive a bitstream 714 (e.g., one or more encoded pictures included in the bitstream 714) for decoding. In some configurations, the received bitstream 714 may include received overhead information, such as a received slice header, received PPS, received buffer description information, etc. The encoded pictures included in the bitstream 714 may include one or more encoded reference pictures and/or one or more other encoded pictures. In some configurations, the bitstream 714 may include or be accompanied by one or more explicit leading picture indicators or absence indicators.

In one configuration, the decoder 712 includes a leading picture determination module 720. In some configurations, the electronic device 702 receives a bitstream 714 and sends the bitstream 714 through the leading picture determination module 720. The leading picture determination module 720 may be part of a decoder 712 or other component on the electronic device 702.

The leading picture determination module 720 may include a variety of modules or sub-modules for determining whether a leading picture is present based on whether a bitstream 714 includes an explicit leading picture indicator. For example, the leading picture determination module 720 may include an SPS module 726a, PPS module 726b, APS module 726c, slice header module 726d, NALU module 726e or other module for determining whether a leading picture indicator is accompanying or included in a bitstream 714. In some configurations, the leading picture determination module 720 may receive the bitstream 714 prior to passing through certain elements of the decoder 712. One benefit of this approach may include identifying whether a leading picture is present without decoding some or all of the bitstream 714. In some configurations, this may prevent inefficient operations, such as decoding a leading picture when it may be scheduled to be discarded.

In some configurations, each of the modules or sub-modules 726 may determine whether a leading picture is present based on varying types of indicators. For example, the SPS module 726a may determine whether a flag or indicator associated with the SPS is present with the bitstream 714. The PPS module 726b may determine whether a flag or indicator associated with the PPS is present with the bitstream 714. The APS module 726c may determine whether a flag or indicator associated with the APS is present with the bitstream 714. The slice header module 726d may determine whether a flag or indicator associated with a slice header of a CRA picture or other picture is present with the bitstream 714. Additionally or alternatively, the NALU module 726e may determine whether a new NALU unit type indicating the presence or absence of a leading picture is present with the bitstream 714. In one configuration, the NALU unit may be associated with a CRA picture and the NALU module 726e may determine that one or more leading pictures follow subsequent to the CRA picture. In some configurations, the NALU module 726e may determine presence of one or more leading pictures from the NAL unit associated with those leading pictures.

Received symbols (in the one or more encoded pictures included in the bitstream 714) may be entropy decoded by an entropy decoding module 768, thereby producing a motion information signal 770 and quantized, scaled and/or transformed coefficients 772.

The motion information signal 770 may be combined with a portion of a reference frame signal 798 from a frame memory 778 at a motion compensation module 774, which may produce an inter-frame prediction signal 782. The quantized, descaled and/or transformed coefficients 772 may be inverse quantized, scaled and inverse transformed by an inverse module 762, thereby producing a decoded residual signal 784. The decoded residual signal 784 may be added to a prediction signal 792 to produce a combined signal 786. The prediction signal 792 may be a signal selected from the inter-frame prediction signal 782 produced the motion compensation module 774 or alternatively the intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 786 (in the current frame, for example). The combined signal 786 may also be filtered by a de-blocking filter 794. The resulting filtered signal 796 may be written to frame memory 778. The resulting filtered signal 796 may include a decoded picture.

The frame memory 778 may include overhead information corresponding to the decoded pictures. For example, the frame memory 778 may include slice headers, PPS information, cycle parameters, buffer description information, etc. One or more of these pieces of information may be signaled from an encoder (e.g., encoder 604). The frame memory 778 may provide a decoded picture 718 or other output signal.

In some configurations, the decoder 712 may include a leading picture determination module 720a in communication with the frame memory 778. For example, the decoder 712 may determine whether a leading picture is present based on one or more leading picture indicators prior to the bitstream 714 passing through the decoder 714 or being entropy decoded or, in some cases, by accessing the frame memory 778 to determine whether one or more leading picture indicators or absence indicators are included with or accompanying a bitstream 714. One benefit of including a leading picture determination module 720a that accesses the frame memory may include providing the electronic device 702 a capability to determine whether a leading picture is present without interfering with the decoding process. In this approach, the leading picture determination module 720a may simply access the frame memory 778 without modifying or decoding one or more pictures.

Figure 8:
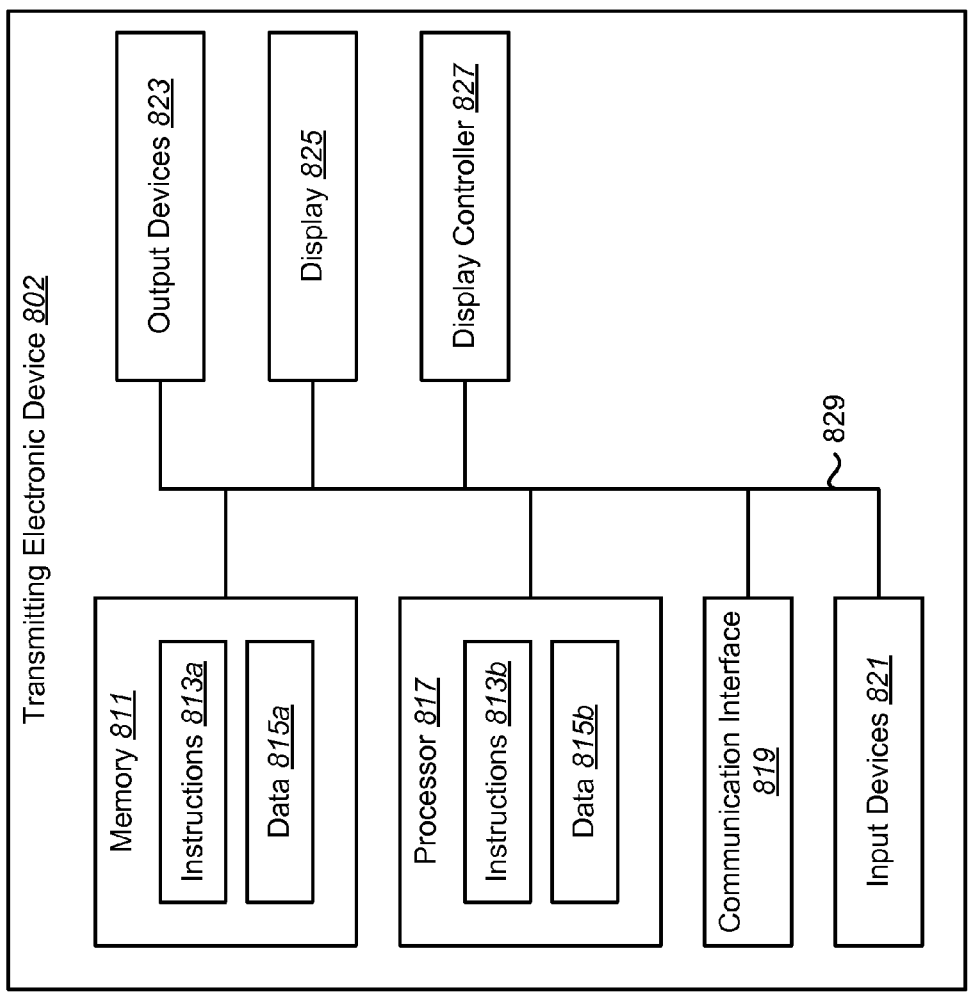
FIG. 8 is a block diagram illustrating various components that may be utilized in a transmitting electronic device.

FIG. 8 illustrates various components that may be utilized in a transmitting electronic device 802. The transmitting electronic device 802 may be implemented as one or more of the electronic devices (e.g., electronic devices 102, 602, 702) described herein.

The transmitting electronic device 802 includes a processor 817 that controls operation of the transmitting electronic device 802. The processor 817 may also be referred to as a Computer Processing Unit (CPU). Memory 811, which may include both read-only memory (ROM), random access memory (RAM) or any type of device that may store information, provides instructions 813a (e.g., executable instructions) and data 815a to the processor 817. A portion of the memory 811 may also include non-volatile random access memory (NVRAM). The memory 811 may be in electronic communication with the processor 817.

Instructions 813b and data 815b may also reside in the processor 817. Instructions 813b and/or data 815b loaded into the processor 817 may also include instructions 813a and/or data 815a from memory 811 that were loaded for execution or processing by the processor 817. The instructions 813b may be executed by the processor 817 to implement the systems and methods disclosed herein.

The transmitting electronic device 802 may include one or more communication interfaces 819 for communicating with other electronic devices (e.g., receiving electronic device). The communication interfaces 819 may be based on wired communication technology, wireless communication technology, or both. Examples of a communication interface 819 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The transmitting electronic device 802 may include one or more output devices 823 and one or more input devices 821. Examples of output devices 823 include a speaker, printer, etc. One type of output device that may be included in a transmitting electronic device 802 is a display device 825. Display devices 825 used with configurations disclosed herein may utilize any suitable image projection technology, such as a cathode ray tube (CRT), liquid crystal display (LCD), light-emitting diode (LED), gas plasma, electroluminescence or the like. A display controller 827 may be provided for converting data stored in the memory 811 into text, graphics, and/or moving images (as appropriate) shown on the display 825. Examples of input devices 821 include a keyboard, mouse, microphone, remote control device, button, joystick, trackball, touchpad, touchscreen, lightpen, etc.

The various components of the transmitting electronic device 802 are coupled together by a bus system 829, which may include a power bus, a control signal bus and a status signal bus, in addition to a data bus. However, for the sake of clarity, the various buses are illustrated in FIG. 8 as the bus system 829. The transmitting electronic device 802, illustrated in FIG. 8, is a functional block diagram rather than a listing of specific components.

Figure 9:
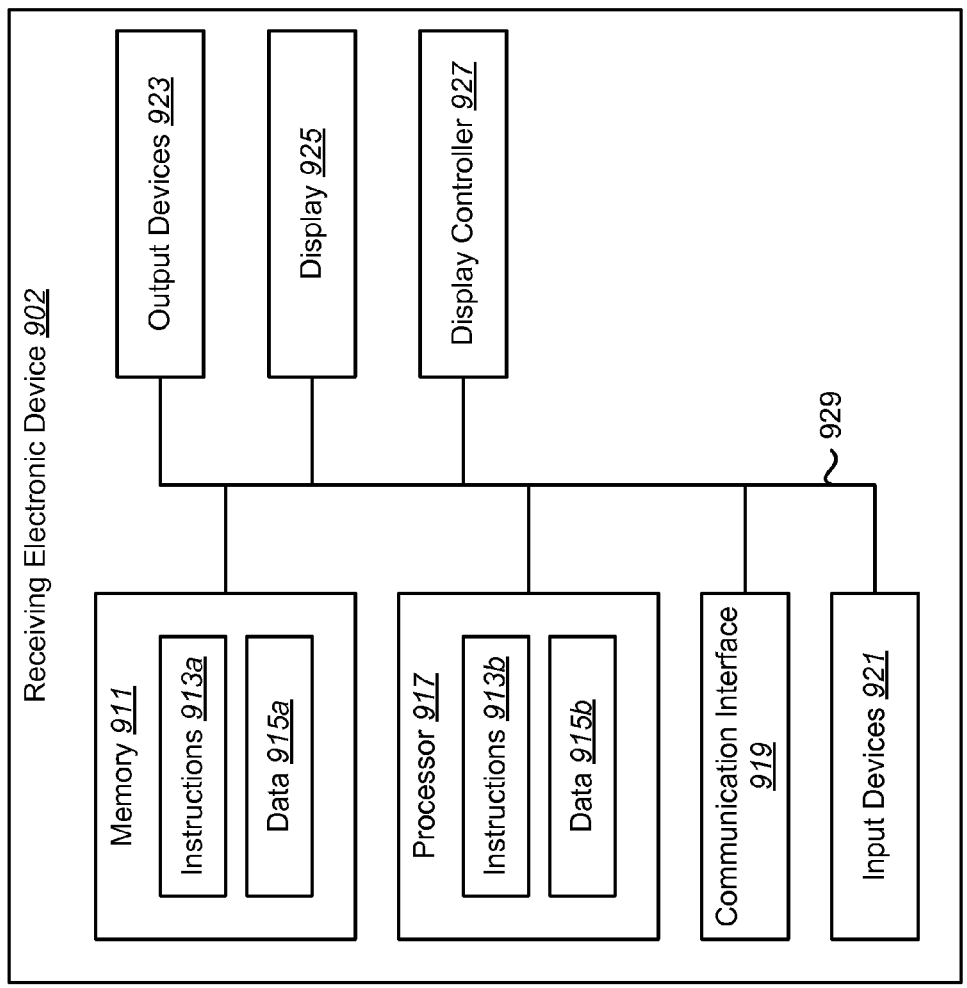
FIG. 9 is a block diagram illustrating various components that may be utilized in a receiving electronic device.

FIG. 9 is a block diagram illustrating various components that may be utilized in a receiving electronic device 902. The receiving electronic device 902 may be implemented as one or more of the electronic devices (e.g., electronic devices 102, 602, 702) described herein.

The receiving electronic device 902 includes a processor 917 that controls operation of the receiving electronic device 902. The processor 917 may also be referred to as a CPU. Memory 911, which may include both read-only memory (ROM), random access memory (RAM) or any type of device that may store information, provides instructions 913a (e.g., executable instructions) and data 915a to the processor 917. A portion of the memory 911 may also include non-volatile random access memory (NVRAM). The memory 911 may be in electronic communication with the processor 917.

Instructions 913b and data 915b may also reside in the processor 917. Instructions 913b and/or data 915b loaded into the processor 917 may also include instructions 913a and/or data 915a from memory 911 that were loaded for execution or processing by the processor 917. The instructions 913b may be executed by the processor 917 to implement the systems and methods disclosed herein.

The receiving electronic device 902 may include one or more communication interface 919 for communicating with other electronic devices (e.g., transmitting electronic device). The communication interfaces 919 may be based on wired communication technology, wireless communication technology, or both. Examples of a communication interface 919 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The receiving electronic device 902 may include one or more output devices 923 and one or more input devices 921. Examples of output devices 923 include a speaker, printer, etc. One type of output device that may be included in a receiving electronic device 902 is a display device 925. Display devices 925 used with configurations disclosed herein may utilize any suitable image projection technology, such as a cathode ray tube (CRT), liquid crystal display (LCD), light-emitting diode (LED), gas plasma, electroluminescence or the like. A display controller 927 may be provided for converting data stored in the memory 911 into text, graphics, and/or moving images (as appropriate) shown on the display 925. Examples of input devices 921 include a keyboard, mouse, microphone, remote control device, button, joystick, trackball, touchpad, touchscreen, lightpen, etc.

The various components of the receiving electronic device 902 are coupled together by a bus system 929, which may include a power bus, a control signal bus and a status signal bus, in addition to a data bus. However, for the sake of clarity, the various buses are illustrated in FIG. 9 as the bus system 929. The receiving electronic device 902 illustrated in FIG. 9 is a functional block diagram rather than a listing of specific components.

Figure 10:
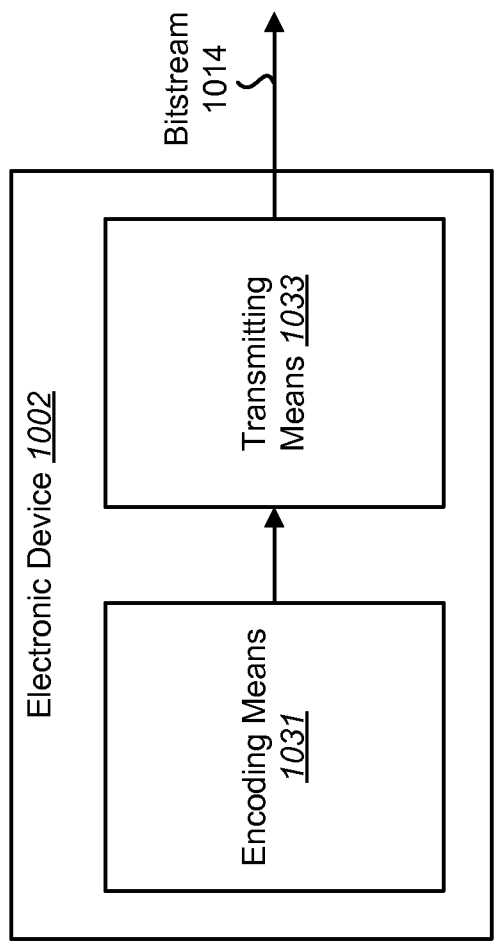
FIG. 10 is a block diagram illustrating one configuration of an electronic device in which systems and methods for identifying a leading picture may be implemented.

FIG. 10 is a block diagram illustrating one configuration of an electronic device 1002 in which systems and methods for identifying a leading picture may be implemented. The electronic device 1002 may include encoding means 1031 and transmitting means 1033. The encoding means 1031 and transmitting means 1033 may be configured to perform one or more similar functions described in connection with FIG. 2, FIG. 3, FIG. 6 and other figures above. FIG. 8 illustrates one example of a concrete apparatus structure of FIG. 10. Other various structures may be implemented to realize one or more of the functions of FIG. 1 and FIG. 6. For example, a DSP may be realized by software.

Figure 11:
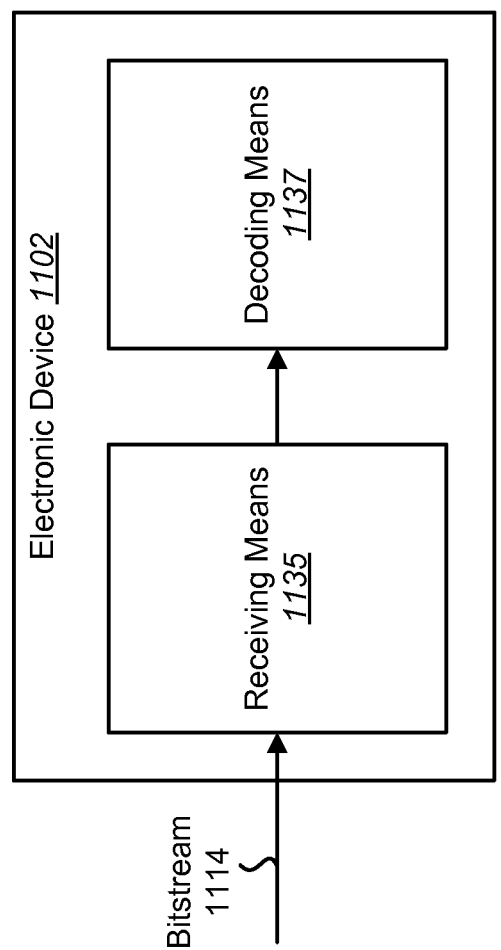
FIG. 11 is a block diagram illustrating one configuration of an electronic device in which systems and methods of identifying a leading picture may be implemented.

FIG. 11 is a block diagram illustrating one configuration of an electronic device 1102 in which systems and methods of identifying a leading picture may be implemented. The electronic device 1102 may include a bitstream 1114, receiving means 1135 and decoding means 1137. The receiving means 1135 and decoding means 1137 may be configured to perform one or more similar functions described in connection with FIG. 2, FIG. 5, FIG. 7 and other figures above. FIG. 9 above illustrates one example of a concrete apparatus structure of FIG. 11. Other various structures may be implemented to realize one or more functions of FIG. 1 and FIG. 7. For example, a DSP may be realized by software.

Figure 12:
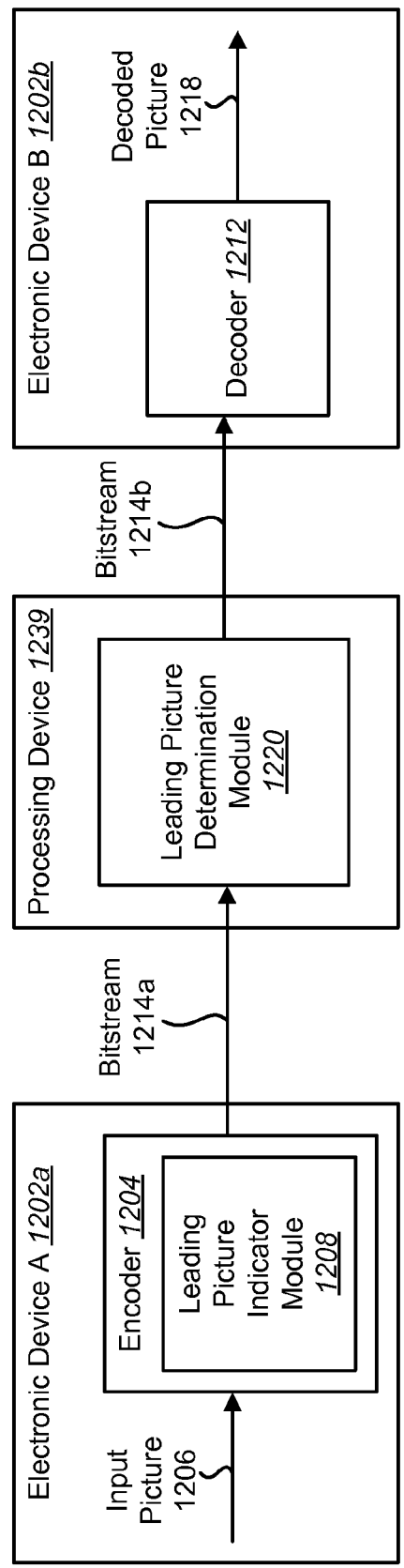
FIG. 12 is a block diagram illustrating several devices in which systems and methods for identifying a leading picture may be implemented.

FIG. 12 is a block diagram illustrating several devices in which systems and methods for identifying a leading picture may be implemented. In one example, electronic device A 1202a, electronic device B 1202b and a processing device 1239 are illustrated. However, it should be noted that electronic device A 1202a, electronic device B 1202b and a processing device 1239 in connection with FIG. 12 may be configured similarly to electronic device A 102a and electronic device B 102b in FIG. 1. For example, electronic device A 1202a may include an encoder 1204 and a leading picture indicator module 1208. The encoder 1204 may further obtain or receive an input picture 1206. Also, the electronic device A 1202a may generate and send a bitstream 1214 similar to a bitstream 114 in other figures.

In one example, bitstream A 1214a may be transferred or sent from electronic device A 1202a to a processing device 1239. The processing device may include a leading picture determination module 1220. The leading picture determination module 1220 in connection with FIG. 12 may perform similar operations to the leading picture determination module 120 in FIG. 1 and may or may not be included in a decoder. Further, the processing device may be one example of an electronic device described in connection to other figures. In one example, the processing device 1239 may be a network node. In one example, the processing device 1239 may determine whether there are any leading pictures in a bitstream 1214. Further, the processing device 1239 may perform one or more operations on a bitstream 1214. Examples of operations that the processing device 1239 may perform on a bitstream 1214 may include discarding a leading picture, storing data associated with the bitstream 1214 or converting the bitstream 1214 and/or sending the bitstream 1214 to an electronic device 1202.

In one example, the processing device 1239 receives bitstream A 1214a, performs an operation on bitstream A 1214a and sends bitstream B 1214B to electronic device B 1202. Electronic device B 1202b described in connection with FIG. 12 may be configured similarly to electronic device B 102b in FIG. 1. Electronic device B 1202b may also include a decoder 1212. Further, the decoder 1212 may or may not include a leading picture determination module. In one configuration, electronic device B 1202b may perform an operation on a bitstream 1214 and generate an output, such as a decoded picture 1218. Electronic device B 1202b may further store, display, discard or otherwise dispose of the decoded picture 1218.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for indicating a leading picture, the device comprising:
   at least one processor configured to:
   identify a first picture including only intra-prediction slices (I-slices) that are decoded using intra prediction only;
   generate information of leading pictures included in the first picture,
   wherein the information is a Network Access Layer (NAL) unit type associated with a random access picture indicating whether or not the first picture has a subsequent leading picture, and wherein the first picture occurs at a random access point; and
   send the information.

2. The electronic device of claim 1, wherein the leading pictures are one or more pictures following the first picture in a decoding order and preceding the first picture in an output order.

3. The electronic device of claim 1, wherein the NAL unit type comprises a NAL unit type associated with the Random Access Picture with the subsequent leading picture.

4. The electronic device of claim 1, wherein the NAL unit type comprises a NAL unit type associated with the Random Access Picture without the subsequent leading picture.

5. A method for indicating a leading picture, the method comprising:
   identifying a first picture including only intra-prediction slices (I-slices) that are decoded using intra prediction only;
   generating information of leading pictures included in the first picture,
   wherein the information is a Network Access Layer (NAL) unit type associated with a random access picture indicating whether or not the first picture has a subsequent leading picture, and wherein the first picture occurs at a random access point; and
   sending the information.

6. The method of claim 5, wherein the leading pictures are one or more pictures following the first picture in a decoding order and preceding the first picture in an output order.

7. The method of claim 5, wherein the NAL unit type comprises a NAL unit type associated with the Random Access Picture with the subsequent leading picture.

8. The method of claim 5, wherein the NAL unit type comprises a NAL unit type associated with the Random Access Picture without the subsequent leading picture.

* * * * *